(12) United States Patent
Biradar et al.

(10) Patent No.: US 11,349,812 B2
(45) Date of Patent: May 31, 2022

(54) CONTROLLING APPLICATION DELIVERY BASED ON A PROFILE AND THRESHOLD

(71) Applicant: Citrix Systems, Inc., Fort Lauderdale, FL (US)

(72) Inventors: Gourish K Biradar, Bengaluru (IN); Kasirao Velugu, Bangalore (IN); Vamshi Raghav, Milpitas, CA (US); Ratnesh Singh Thakur, San Jose, CA (US); Rama Rao Katta, Freemont, CA (US); Srinivasa Reddy Kasu, Bangalore (IN); Kapil Jaisinghani, Bangalore (IN); Satyendra Tiwari, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/117,638

(22) Filed: Dec. 10, 2020

(65) Prior Publication Data

US 2022/0141187 A1    May 5, 2022

(30) Foreign Application Priority Data

Oct. 29, 2020 (IN) .............................. 202021047217

(51) Int. Cl.
*H04L 9/40* (2022.01)
*H04L 67/60* (2022.01)
*H04L 67/56* (2022.01)

(52) U.S. Cl.
CPC ........ *H04L 63/0263* (2013.01); *H04L 63/029* (2013.01); *H04L 63/14* (2013.01);
(Continued)

(58) Field of Classification Search
CPC ... H04L 63/0263; H04L 63/029; H04L 63/14; H04L 63/1408; H04L 63/1433; H04L 67/28; H04L 67/32
See application file for complete search history.

(56) References Cited

U.S. PATENT DOCUMENTS

| 7,181,769 B1 * | 2/2007 | Keanini | H04L 63/1416 713/166 |
| 7,877,795 B2 * | 1/2011 | Aaron | H04L 63/1408 726/11 |

(Continued)

OTHER PUBLICATIONS

International Search Report and Written Opinion on PCT Appl. No. PCT/US2021/54714 dated Jan. 14, 2022.

*Primary Examiner* — Ramy M Osman
(74) *Attorney, Agent, or Firm* — Foley & Lardner LLP

(57) ABSTRACT

Described embodiments provide systems and methods for learning across multiple application delivery controllers and updating settings across the application delivery controllers. A profile can be generated based on selection of a set of intermediary devices managed by a device. The set of intermediary devices configured to load balance data of an application hosted in different computing environments. Activity can be identified at the intermediary devices with use of a firewall. The activity having an appearance of a malicious attack on at least one intermediary device of the set. The device can determine if the activity is permissible or a violation based on a comparison of an aggregation of data records for the identified activity and a threshold. The device can provide a notification to at least one intermediary device of the set to configure the at least one intermediary device to allow the activity or prevent the activity.

20 Claims, 10 Drawing Sheets

(52) U.S. Cl.
CPC ...... *H04L 63/1408* (2013.01); *H04L 63/1433* (2013.01); *H04L 67/28* (2013.01); *H04L 67/32* (2013.01)

(56) References Cited

U.S. PATENT DOCUMENTS

| | | | |
|---|---|---|---|
| 10,122,751 B2* | 11/2018 | King-Wilson | H04L 63/1433 |
| 10,567,344 B2* | 2/2020 | Shanks | H04L 63/0263 |
| 2003/0079146 A1* | 4/2003 | Burstein | H04L 63/029 |
| | | | 726/12 |
| 2008/0141332 A1* | 6/2008 | Treinen | H04L 63/1416 |
| | | | 726/1 |
| 2008/0148380 A1* | 6/2008 | Abzarian | H04L 63/0263 |
| | | | 726/11 |
| 2008/0148381 A1* | 6/2008 | Aaron | H04L 63/1408 |
| | | | 726/11 |
| 2010/0132029 A1 | 5/2010 | Chauhan et al. | |
| 2012/0311693 A1* | 12/2012 | Horman | H04L 61/1511 |
| | | | 726/14 |
| 2014/0068701 A1* | 3/2014 | Burchfield | H04L 63/0263 |
| | | | 726/1 |
| 2017/0230451 A1 | 8/2017 | Paramasivam | |
| 2018/0063085 A1 | 3/2018 | Shanks et al. | |

* cited by examiner

CONTROLLING APPLICATION DELIVERY BASED ON A PROFILE AND THRESHOLD

CROSS-REFERENCE TO RELATED APPLICATION

This application claims priority to and the benefit of Indian Provisional Patent Application No. 202021047217, titled "SYSTEMS AND METHODS FOR OPERATION OF APPLICATION DELIVERY CONTROLLERS," and filed on Oct. 29, 2020, the contents of all of which are hereby incorporated herein by reference in its entirety for all purposes.

BACKGROUND

In network environments, a client can access a plurality of resources or applications provided through a server. A device may monitor the client accessing the resources or applications over the network environment.

SUMMARY

Systems and method for operation of intermediary devices (e.g., application delivery controllers (ADCs)) using traffic behaviors at the respective intermediary devices is provided herein. The operation can include update or modification of, for example, firewall settings at the intermediary devices based in part on learned traffic behaviors (e.g., malicious attacks, security issues, false positives) or traffic patterns identified using data records from the respective intermediary devices.

A device (e.g., application delivery management (ADM)) can generate a learning profile for multiple intermediary devices based in part on data records received from the intermediary devices. The intermediary devices can be grouped or organized in sets or subsets based on an identifier of the respective intermediary devices, a firewall profile name deployed at the respective intermediary devices and/or an application monitored by the respective intermediary device. The device can aggregate traffic behaviors, including but not limited to, malicious attacks, security breaches or false positives at one or more intermediary devices of a set of intermediary devices to generate and modify the profile for the set of intermediary devices. The profile can include rules, settings and/or relaxations (e.g., exceptions) deployed to each intermediary device of the set. The intermediary devices can be managed or monitored by the device and execute in different cloud environments, different regions and/or different availability zones. The device can use traffic behaviors learned from a first intermediary device to update or modify firewall settings at one or more different intermediary devices. The device can use the profile to propagate updates or modifications to firewalls deployed by each of the intermediary devices within a set in contrast to updating each intermediary devices individually. The device can use traffic behaviors learned from a first intermediary device to update or modify firewall settings at one or more different intermediary devices.

In at least one aspect, a method is provided. The method can include generating, by a computing device, a profile based on selection of a set of intermediary devices managed by the computing device. The set of intermediary devices configured to load balance data of an application hosted in different computing environments. The method can include identifying, by the computing device, activity at the set of intermediary devices with use of a firewall. The activity having an appearance of a malicious attack on at least one intermediary device of the set. The method can include determining, by the computing device that the activity is permissible based on a comparison of an aggregation of data records for the identified activity and a threshold. The aggregation of data records being based on the generated profile. The method can include providing, by the computing device, a notification to at least one intermediary device of the set in response to the determination that the activity is permissible. The notification to configure the at least one intermediary device to allow the activity.

In embodiments, the method can include segregating, by the computing device, multiple intermediary devices into the set of intermediary devices based on at least one of: an identifier of the intermediary devices, a name of a firewall provided by the intermediary devices, or a name of an application monitored by the intermediary devices. The threshold can indicate a limit based on at least one of: a type of traffic, an address of a device, a number of requests, or a type of request. The method can include modifying, by the computing device responsive to determining that the activity is permissible, the profile to include an exception for the activity. The method can include providing, by the computing device to the set of intermediary devices, the notification to update firewalls of the set of intermediary devices to include the exception.

The method can include determining, by the computing device, subsequent activity at the set of intermediary devices is not permissible based on a comparison of the aggregation of data records for the subsequent activity and the threshold. The method can include providing, by the computing device, a subsequent notification to at least one intermediary device of the set in response to the determination that the subsequent activity is a violation. The subsequent notification to configure the at least one intermediary device to prevent the subsequent activity. The method can include determining, by the computing device, a type of traffic identified in the aggregation of data records exceeds the threshold indicating a violation of a rule of the firewall for the type of traffic. The method can include providing, by the computing device to the set of intermediary devices, a subsequent notification to prevent the type of traffic responsive to the type of traffic exceeding the threshold.

The method can include determining, by the computing device using the aggregation of data records data, a violation occurring at multiple intermediary devices of the set of intermediary devices. The method can include modifying, by the computing device, the profile to include a setting to prevent the violation. The method can include providing, by the computing device to the set of intermediary devices, a subsequent notification to update firewalls of the set of intermediary devices to include the setting. The method can include selecting, by the computing device, the intermediary devices for the set of intermediary devices based on a property of firewalls provided by the intermediary devices. The method can include selecting, by the computing device, the intermediary devices for the set of intermediary devices based on a property of at least one application monitored by the intermediary devices.

The method can include incrementing, by the computing device responsive to receiving data from one or more intermediary devices, a value indicative of a number of records received from the set of intermediary devices. The method can include providing, by the computing device responsive to the value exceeding the threshold, a subsequent notification to the set of intermediary devices to update firewalls of the set of intermediary devices. The method can include monitoring, by the computing device, the set of intermediary devices, wherein a plurality of the intermediary devices of the set of intermediary devices are executable in different cloud environments, different regions or different zones from one another.

In at least one aspect, a system is provided. The system can include a computing device comprising one or more processors coupled to memory. The computing device configured to generate a profile based on selection of a set of intermediary devices managed by the computing device. The set of intermediary devices configured to load balance data of an application hosted in different computing environments. The computing device configured to identify activity at the set of intermediary devices with use of a firewall. The activity having an appearance of a malicious attack on at least one intermediary device of the set. The computing device configured to determine that the activity is permissible based on a comparison of an aggregation of data records for the identified activity and a threshold. The aggregation of data records being based on the generated profile. The computing device configured to provide a notification to at least one intermediary device of the set in response to the determination that the activity is permissible. The notification to configure the at least one intermediary device to allow the activity.

In embodiments, the computing device can be configured to segregate multiple intermediary devices into the set of intermediary devices based on at least one of: an identifier of the intermediary devices, a name of a firewall provided by the intermediary devices, or a name of an application monitored by the intermediary devices. The computing device configured to modify, responsive to determining that the activity is permissible, the profile to include an exception for the activity. The computing device configured to provide, to the set of intermediary devices, the notification to update firewalls of the set of intermediary devices to include the exception. The computing device configured to determine subsequent activity at the set of intermediary devices is not permissible based on a comparison of the aggregation of data records for the subsequent activity and the threshold. The computing device configured to provide a subsequent notification to at least one intermediary device of the set in response to the determination that the subsequent activity is a violation. The subsequent notification to configure the at least one intermediary device to prevent the subsequent activity.

The computing device configured to determine a type of traffic identified in the aggregation of data records exceeds the threshold indicating a violation of a rule of the firewall for the type of traffic. The computing device configured to provide, to the set of intermediary devices, a subsequent notification to prevent the type of traffic responsive to the type of traffic exceeding the threshold. The computing device configured to determine, using the aggregation of data records data, a violation occurring at multiple intermediary devices of the set of intermediary devices. The computing device configured to modify the profile to include a setting to prevent the violation. The computing device configured to provide, to the set of intermediary devices, a subsequent notification to update firewalls of the set of intermediary devices to include the setting.

In at least one aspect, a non-transitory computer-readable medium is provided. The non-transitory computer-readable medium can include instructions that, when executed by the processor of a device, cause the processor to generate a profile based on selection of a set of intermediary devices managed by the computing device. The set of intermediary devices configured to load balance data of an application hosted in different computing environments. The non-transitory computer-readable medium can include instructions that, when executed by the processor of a device, cause the processor to identify activity at the set of intermediary devices with use of a firewall. The activity having an appearance of a malicious attack on at least one intermediary device of the set. The non-transitory computer-readable medium can include instructions that, when executed by the processor of a device, cause the processor to determine that the activity is permissible based on a comparison of an aggregation of data records for the identified activity and a threshold. The aggregation of data records being based on the generated profile. The non-transitory computer-readable medium can include instructions that, when executed by the processor of a device, cause the processor to provide a notification to at least one intermediary device of the set in response to the determination that the activity is permissible. The notification to configure the at least one intermediary device to allow the activity.

The non-transitory computer-readable medium can include instructions that, when executed by the processor of a device, cause the processor to modify, responsive to determining that the activity is permissible, the profile to include an exception for the activity. The non-transitory computer-readable medium can include instructions that, when executed by the processor of a device, cause the processor to provide, to the set of intermediary devices, the notification to update firewalls of the set of intermediary devices to include the exception. The non-transitory computer-readable medium can include instructions that, when executed by the processor of a device, cause the processor to determine subsequent activity at the set of intermediary devices is a violation based on a comparison of the aggregation of data records for the subsequent activity and the threshold. The non-transitory computer-readable medium can include instructions that, when executed by the processor of a device, cause the processor to provide a subsequent notification to at least one intermediary device of the set in response to the determination that the subsequent activity is a violation, the subsequent notification to configure the at least one intermediary device to prevent the subsequent activity.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
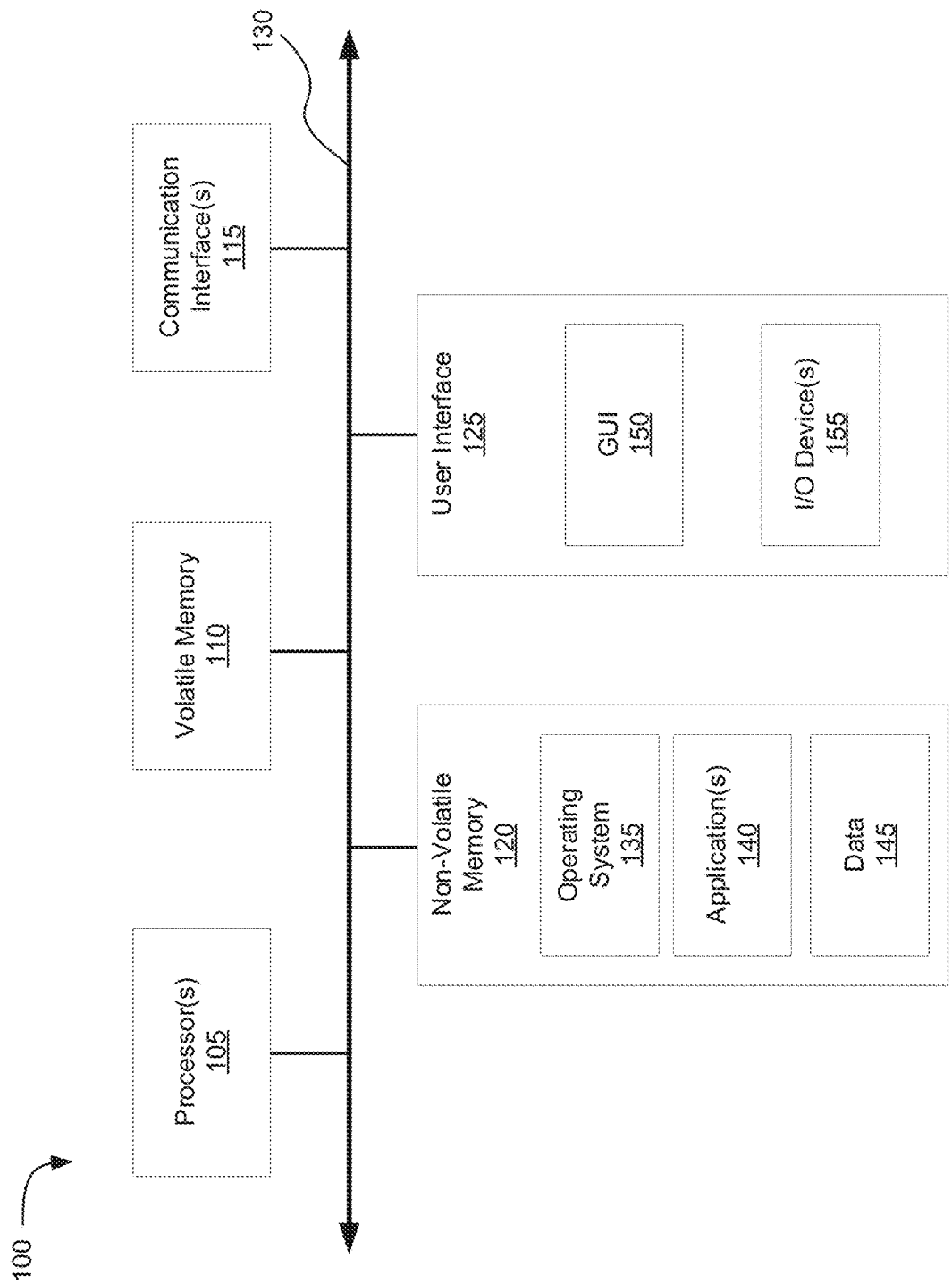
FIG. 1A is a block diagram of embodiments of a computing device.

Systems and methods for operation of intermediary devices that include generating a profile for updating settings across multiple intermediary devices (e.g., application delivery controllers (ADCs)) are provided herein. A device (e.g., application delivery management (ADM)) can manage or monitor a plurality of intermediary devices. The intermediary devices can be executing in one or more different cloud environment, different regions and/or different availability zones. The device can group or organize sets of the intermediary devices (e.g., ADC instances) and generate a profile (e.g., learning profile) to update or modify firewall settings at intermediary devices within the set of intermediary devices. The profile can include rules or relations (e.g., exceptions) to firewall settings of the respective intermediary device. The device can generate and update the profile based in part on data records received from the intermediary devices that include traffic characteristics at the intermediary devices. The device can aggregate the data records to learn or identify include traffic behaviors, traffic characteristics and/or traffic patterns at the intermediary devices to modify firewall settings at the intermediary devices, for example, to protect against malicious attacks and/or reduce a number of false positives or falsely identified traffic violations. The device can deploy the profile to the intermediary devices ADCs within the set to propagate changes or updates to firewall settings across the intermediary devices.

Intermediary devices can provide or execute an application firewall to monitor and detect traffic behaviors and patterns corresponding to requests for one or more applications. The traffic behaviors or traffic patterns can include, but not limited to, malicious attacks, traffic violations, data breaches and/or falsely identified violations. An intermediary device can learn or identify traffic patterns or attack patterns at a local firewall and determine changes or modifications to settings of the respective firewall to reduce or prevent the malicious attacks, traffic violations, data breaches and/or falsely identified violations. However, the intermediary device may use data from the local firewall and thus the learning is localized to the respective intermediary device instance and may miss important learned traffic patterns from other intermediary devices. Further, the changes or modification made by the intermediary devices can be limited to the local firewall. This localization of the learning can limit the scaling of this traffic learning and propagation of updates to other intermediary devices, for example, in a different cloud environment, region or availability zone.

The systems and methods provided herein can include aggregation of data and learning across multiple intermediary devices in different cloud environments, regions and/or availability zones to learn traffic behaviors using the aggregated data and provide scaling of updates or changes across the respective intermediary devices and firewalls provided by the respective intermediary devices. For example, the device (e.g., a server that provides Citrix Application Delivery Management (ADM)) can manage a plurality of intermediary devices to provide scaling of the learning process over the plurality of intermediary device instances. The device can group or segregate the intermediary devices into sets or groupings based in part on a property of a firewall (e.g., firewall profile name) provided by the intermediary device and/or a property of an application (e.g., name of application, type of application) monitored by the intermediary device and generate a learning profile for the set of intermediary device. In embodiments, the device can select intermediary devices executing the same firewall profile for a set, intermediary devices monitoring the same application for a set and/or intermediary devices executing the same firewall profile and monitoring the same application for a set. The learning profile can include a plurality of data records received from the intermediary devices in the set and the device can aggregate the data records to learn traffic behaviors and traffic patterns occurring at the intermediary devices in the set. Thus, the device can use traffic patterns learned from a first intermediary device to update or modify firewall settings at other different intermediary devices included in the same set as the first intermediary device. In embodiments, if the first intermediary device experiences a type of malicious attack, the device can learn the attack pattern and provide updates to prevent the malicious attack from resulting in a security breach at the other intermediary devices in the same set as the first intermediary devices. Thus, the device can scale learning of traffic patterns across multiple intermediary devices and propagate changes or updates to multiple intermediary devices using a single or common profile.

The data records can be provided to the device from the intermediary devices as part of a security check or security insight for monitoring traffic violations and/or falsely identified violations at an intermediary device. The device can receive the data records from the intermediary devices and convert them from a first format to a second format for aggregating the data records. For example, the intermediary devices can be executing in different environments and can generate or provide data records in different formats. The device can decode and/or convert the format of the received data records to a single or common format for aggregating the data together within the learning profile of the set the respective intermediary devices are included. The device can increment a counter or other software implemented feature indicating a number of data records received and update the learning profile of the set of intermediary devices using the received data records. In some embodiments, the data records can be organized or grouped within the profile based on a type of traffic (e.g., type of attack, type of false positive) and the device can update the different data records within the profile responsive to receiving a data record including data for the same type of traffic.

The device can perform analytics on the received data records to learn traffic behaviors and patterns and identify any modifications or changes to be made at the intermediary devices in the set to reduce or prevent different types of attacks or false identifications of violations. The device can create thresholds for different types of traffic, for example, for different types of attacks or falsely identified violations (e.g., false positives) to track or determine when to deploy an update to a set of intermediary devices. In embodiment, responsive to receiving a data record, the device can determine the type of traffic indicated in the data record and determine if the new data record causes a threshold to be exceeded. If the device determines a data record or type of traffic has exceeded a threshold, the device can change a status of the learning profile from a ready state to a deploy state.

The device can determine one or more settings or rules to modify or update based in part on the type of traffic that exceeded the threshold. For example, the device can determine to relax or generate an exception for a type of traffic that has repeatedly resulted in a false positive or false identification of a violation at one or more intermediary devices in the set. The device can relax one or more settings for a firewall such that subsequent or futures events including the same type of traffic do not result in a false positive or false identification of a violation. In embodiments, the device can determine to create new settings or rules in response to a type of traffic (e.g., type of attack) that has repeatedly resulted in a security breach at one or more intermediary devices in the set. The device can create the new settings for the firewalls provided by the intermediary devices in the set such that subsequent or futures events including the same type of traffic do not result in a security breach.

The device can deploy and propagate the learning profile including the new or modified settings to the intermediary devices in the set to synchronize and scale the changes across the multiple intermediary devices. In embodiments, responsive to providing the modified learning profile to the intermediary devices, the device can update or change the status of the learning profile from deploy status to ready status. The systems and methods provided herein can provide scalable, reliable and centralized learning across multiple intermediary devices using real time and dynamic traffic information using a single learning profile generated for the multiple intermediary devices.

Section A describes a computing environment which may be useful for practicing embodiments described herein;

Section B describes a network environment and computing environment which may be useful for practicing embodiments described herein; and Section C describes methods and systems for centralized learning across multiple application delivery controllers.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
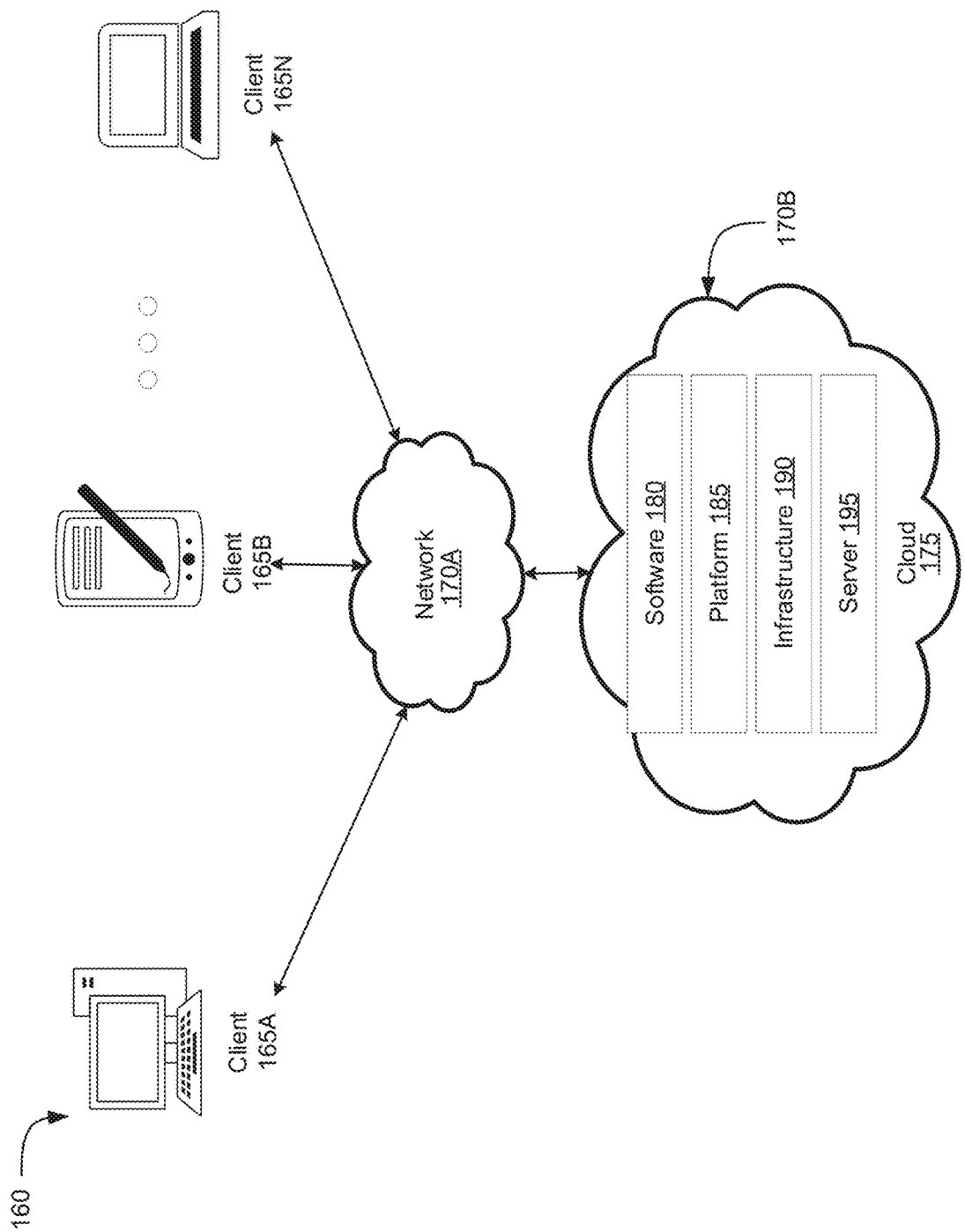
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165*a*-165*n*, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Network and Computing Environment

Figure 2A:
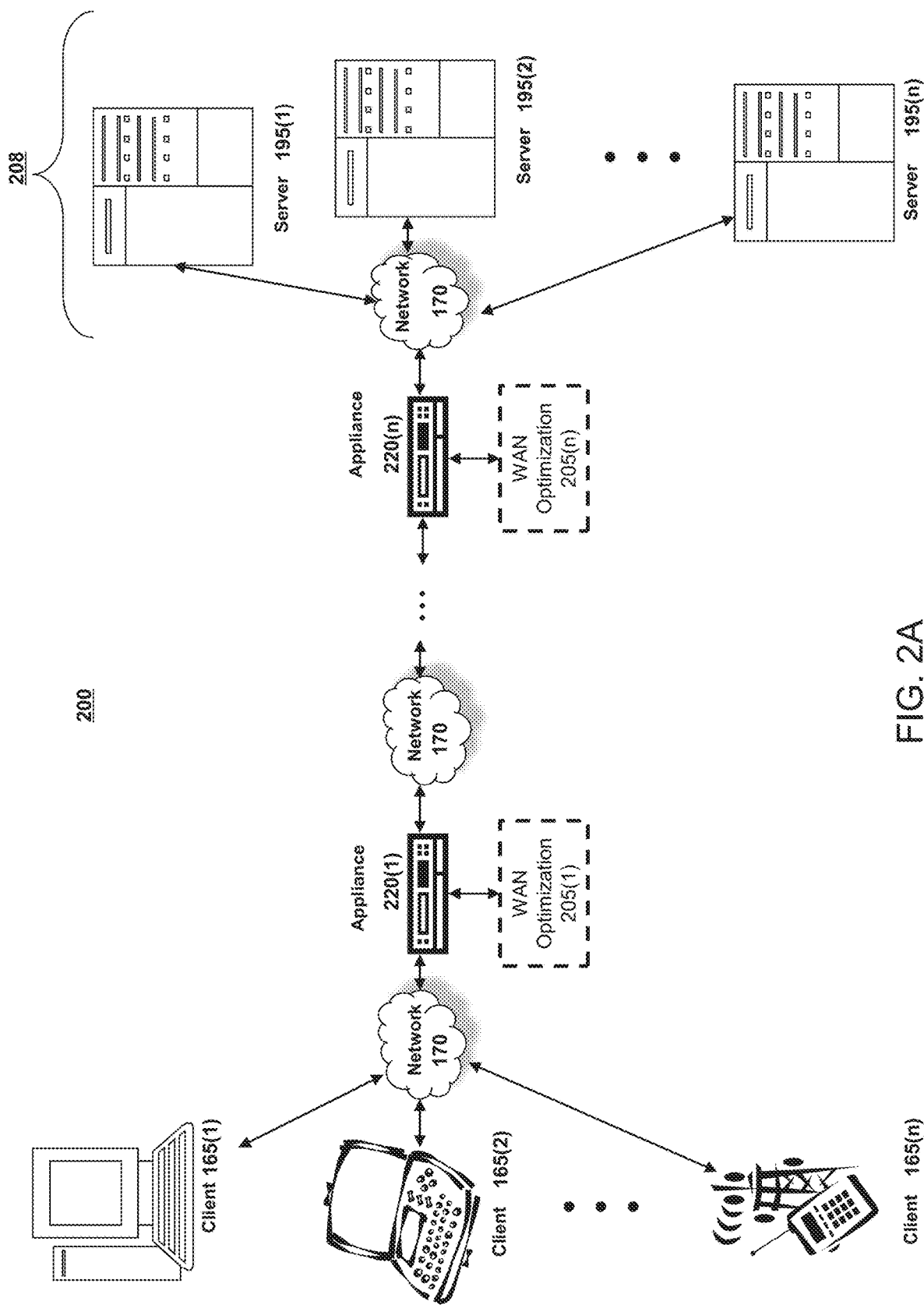
FIG. 2A is a block diagram of a network computing system, in accordance with an illustrative embodiment.

Referring to FIG. 2A, an illustrative network environment 200 is depicted. Network environment 200 may include one or more clients 165(1)-165(n) (also generally referred to as local machine(s) 165 or client(s) 165) in communication with one or more servers 195(1)-195(n) (also generally referred to as remote machine(s) 195 or server(s) 195) via one or more networks 170(1)-170n (generally referred to as network(s) 170). In some embodiments, a client 165 may communicate with a server 195 via one or more appliances 220(1)-220n (generally referred to as appliance(s) 220 or gateway(s) 220).

Although the embodiment shown in FIG. 2A shows one or more networks 170 between clients 165 and servers 195, in other embodiments, clients 165 and servers 195 may be on the same network 170. The various networks 170 may be the same type of network or different types of networks. For example, in some embodiments, network 170(1) may be a private network such as a local area network (LAN) or a company Intranet, while network 170(2) and/or network 170(n) may be a public network, such as a wide area network (WAN) or the Internet. In other embodiments, both network 170(1) and network 170(n) may be private networks. Networks 170 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 220 may be located at various points or in various communication paths of network environment 200. For example, appliance 220 may be deployed between two networks 170(1) and 170(2), and appliances 220 may communicate with one another to work in conjunction to, for example, accelerate network traffic between clients 165 and servers 195. In other embodiments, the appliance 220 may be located on a network 170. For example, appliance 220 may be implemented as part of one of clients 165 and/or servers 195.

As shown in FIG. 2A, one or more servers 195 may operate as a server farm 208. Servers 195 of server farm 208 may be logically grouped, and may either be geographically co-located (e.g., on premises) or geographically dispersed (e.g., cloud based) from clients 165 and/or other servers 195. In an embodiment, server farm 208 executes one or more applications on behalf of one or more of clients 165 (e.g., as an application server), although other uses are possible, such as a file server, gateway server, proxy server, or other similar server uses. Clients 165 may seek access to hosted applications on servers 195.

As shown in FIG. 2A, in some embodiments, appliances 220 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 220 may be a performance enhancing proxy or a WAN optimization controller.

Figure 2B:
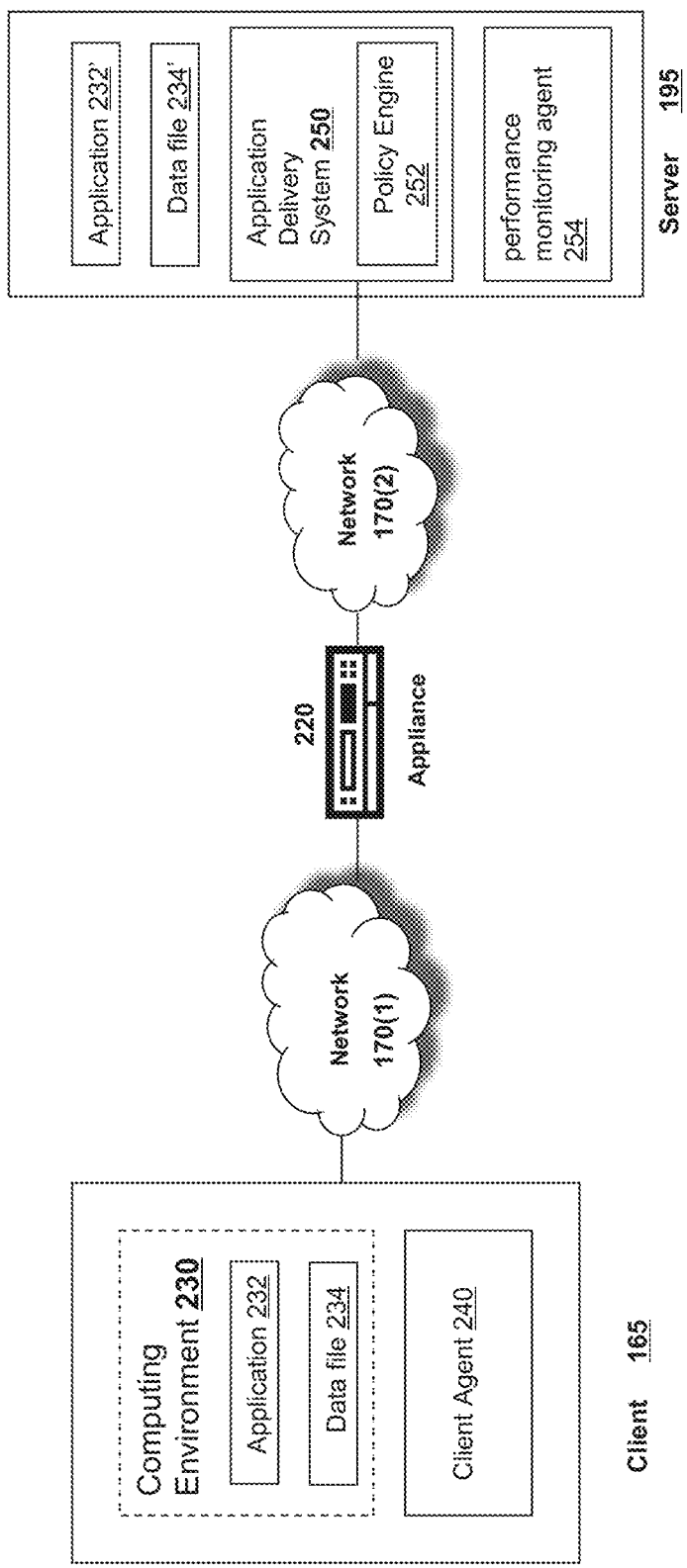
FIG. 2B is a block diagram of a network computing system for delivering a computing environment from a server to a client via an appliance, in accordance with an illustrative embodiment.

Referring to FIG. 2B, an example network environment, 200', for delivering and/or operating a computing network environment on a client 165 is shown. As shown in FIG. 2B, a server 195 may include an application delivery system 250 for delivering a computing environment, application, and/or data files to one or more clients 165. Client 165 may include client agent 240 and computing environment 230. Computing environment 230 may execute or operate an application, 16, that accesses, processes or uses a data file 234. Computing environment 230, application 232 and/or data file 234 may be delivered via appliance 220 and/or the server 195.

Appliance 220 may accelerate delivery of all or a portion of computing environment 230 to a client 165, for example by the application delivery system 250. For example, appliance 220 may accelerate delivery of a streaming application and data file processable by the application from a data center to a remote user location by accelerating transport layer traffic between a client 165 and a server 195. Such acceleration may be provided by one or more techniques, such as: 1) transport layer connection pooling, 2) transport layer connection multiplexing, 3) transport control protocol buffering, 4) compression, 5) caching, or other techniques. Appliance 220 may also provide load balancing of servers 195 to process requests from clients 165, act as a proxy or access server to provide access to the one or more servers 195, provide security and/or act as a firewall between a client 165 and a server 195, provide Domain Name Service (DNS) resolution, provide one or more virtual servers or virtual internet protocol servers, and/or provide a secure virtual private network (VPN) connection from a client 165 to a server 195, such as a secure socket layer (SSL) VPN connection and/or provide encryption and decryption operations.

Application delivery management system 250 may deliver computing environment 230 to a user (e.g., client 165), remote or otherwise, based on authentication and authorization policies applied by policy engine 252. A remote user may obtain a computing environment and access to server stored applications and data files from any network-connected device (e.g., client 165). For example, appliance 220 may request an application and data file from server 195. In response to the request, application delivery system 250 and/or server 195 may deliver the application and data file to client 165, for example via an application stream to operate in computing environment 230 on client 165, or via a remote-display protocol or otherwise via remote-based or server-based computing.

Policy engine 252 may control and manage the access to, and execution and delivery of, applications. For example, policy engine 252 may determine the one or more applications a user or client 165 may access and/or how the application should be delivered to the user or client 165, such as a server-based computing, streaming or delivering the application locally to the client 240 for local execution.

For example, in operation, a client 165 may request execution of an application (e.g., application 232') and application delivery system 250 of server 195 determines how to execute application 232', for example based upon credentials received from client 165 and a user policy applied by policy engine 252 associated with the credentials. For example, application delivery system 250 may enable client 165 to receive application-output data generated by execution of the application on a server 195, may enable client 165 to execute the application locally after receiving the application from server 195, or may stream the application via network 170 to client 165. For example, in some embodiments, the application may be a server-based or a remote-based application executed on server 195 on behalf of client 165. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 195 may include a performance monitoring service or agent 244. In some embodiments, a dedicated one or more servers 195 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 165 (e.g., client agent 240), servers 195 (e.g., agent 254) or an appliance 220. In general, monitoring agents (e.g., 240 and/or 254) execute transparently (e.g., in the background) to any application and/or user of the device.

The monitoring agents 240 and 254 may monitor, measure, collect, and/or analyze data on a predetermined frequency, based upon an occurrence of given event(s), or in real time during operation of network environment 200. The monitoring agents 240 and 254 may monitor resource consumption and/or performance of hardware, software, and/or communications resources of clients 165, networks 170, appliances 220 and/or WAN optimization appliances 205, and/or servers 195. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 240 and 254 may provide application performance management for application delivery system 250. For example, based upon one or more monitored performance conditions or metrics, application delivery system 250 may be dynamically adjusted, for example periodically or in real-time, to optimize application delivery by servers 195 to clients 165 based upon network environment performance and conditions.

In described embodiments, clients 165, servers 195, and appliances 220 and WAN optimization appliances 205 may be deployed as and/or executed on any type and form of computing device, such as any desktop computer, laptop computer, or mobile device capable of communication over at least one network and performing the operations described herein. For example, clients 165, servers 195 and/or appliances 220 and WAN optimization appliances 205 may each correspond to one computer, a plurality of computers, or a network of distributed computers such as computer 100 shown in FIG. 1A.

Figure 3:
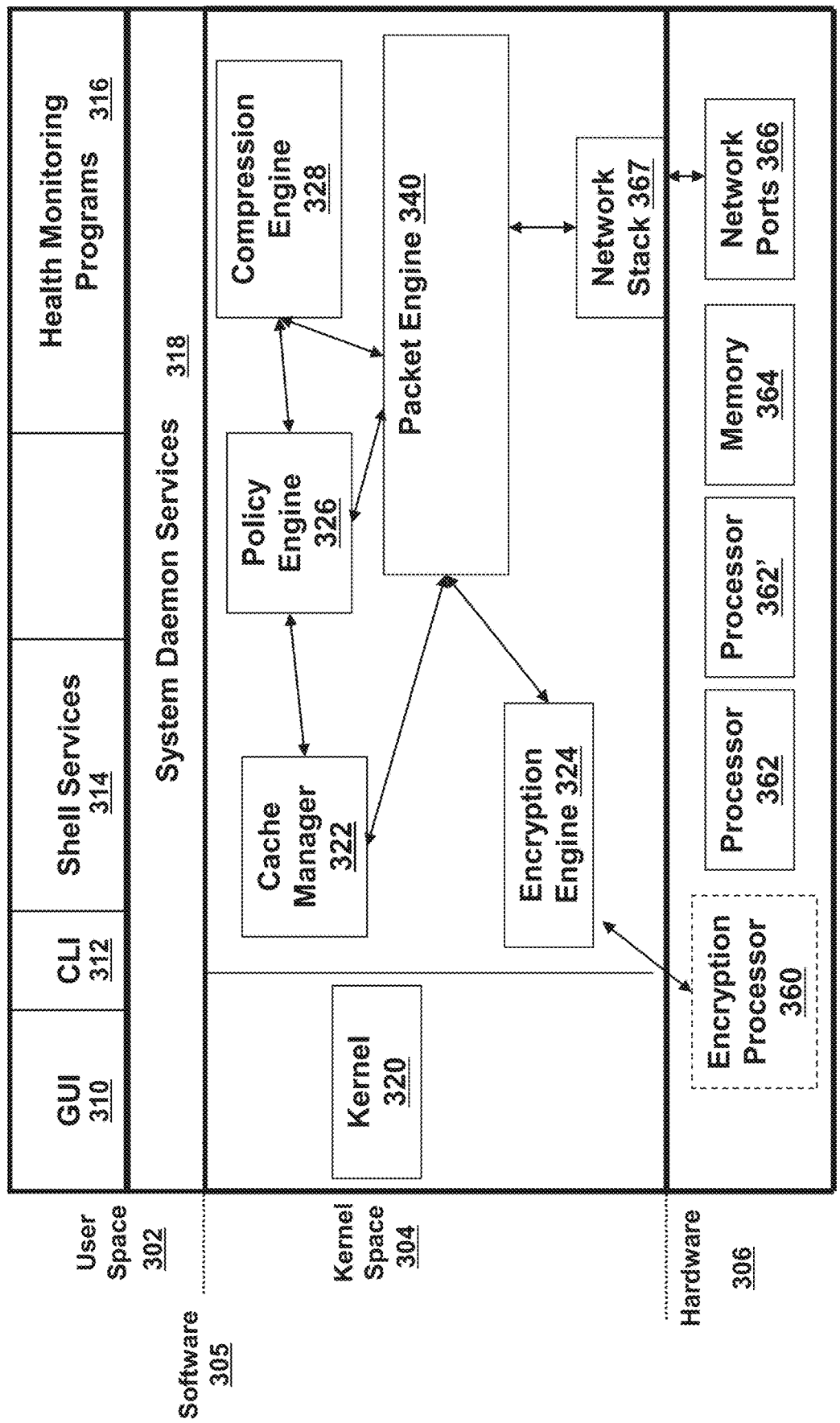
FIG. 3 is a block diagram of an appliance for processing communications between a client and a server, in accordance with an illustrative embodiment.
Figure 4A:
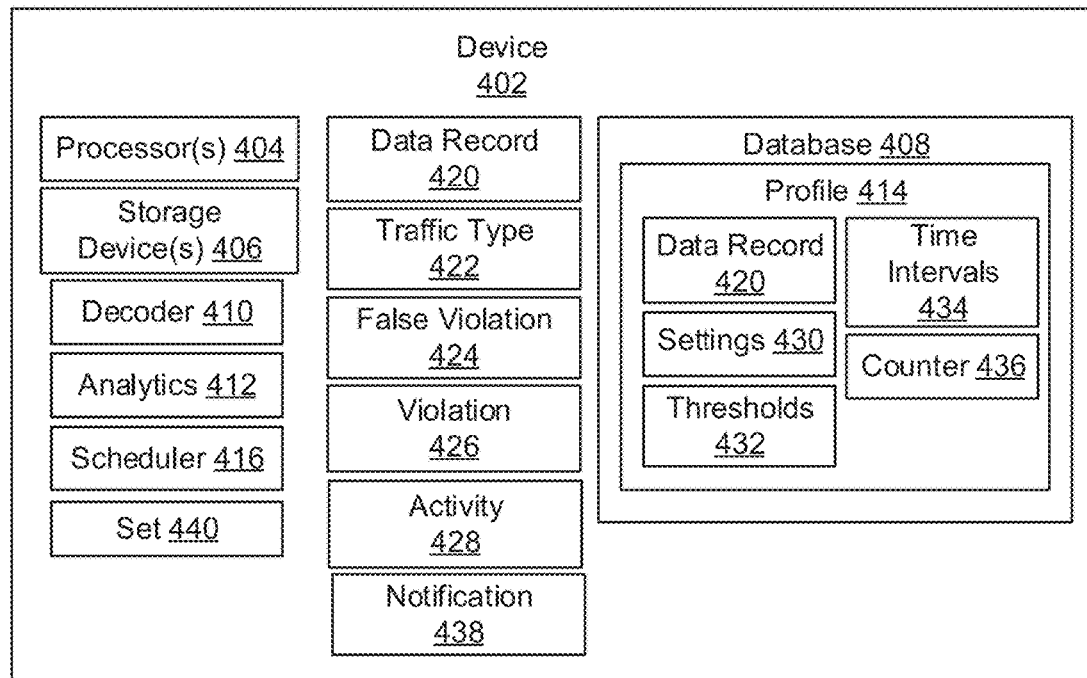
FIG. 4A is a block diagram of a system for operation of multiple application delivery controllers.
Figure 4A:
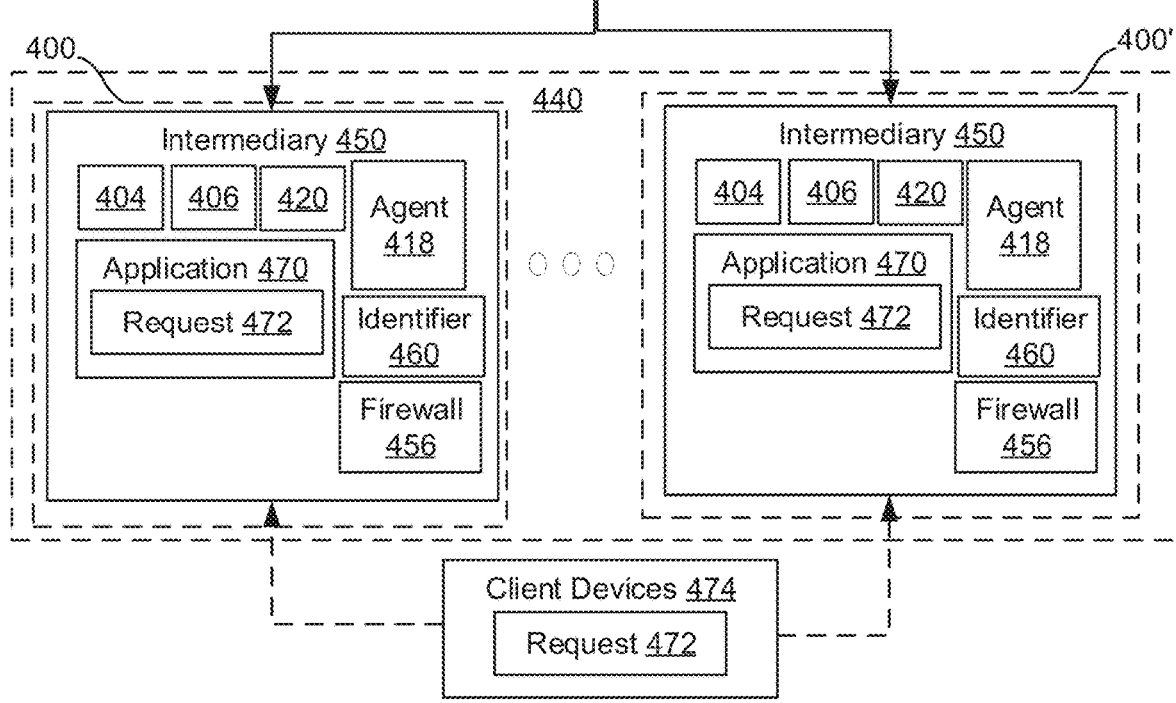
Figure 4B:
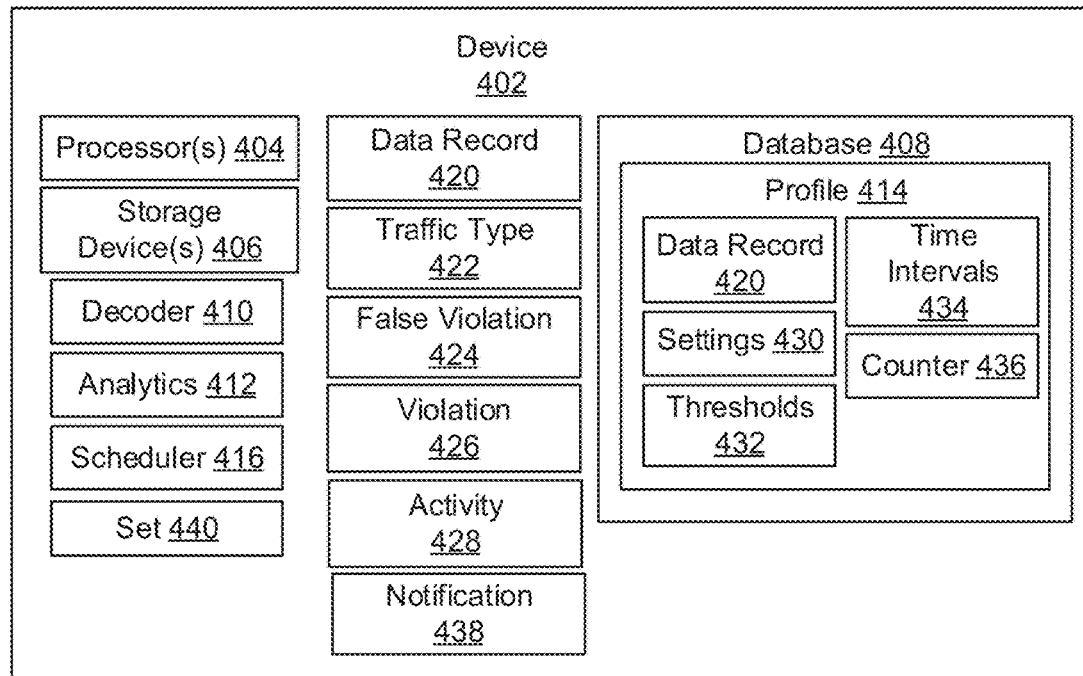
FIG. 4B is a block diagram of a system for operation of multiple application delivery controllers in different cloud environments.
Figure 4B:
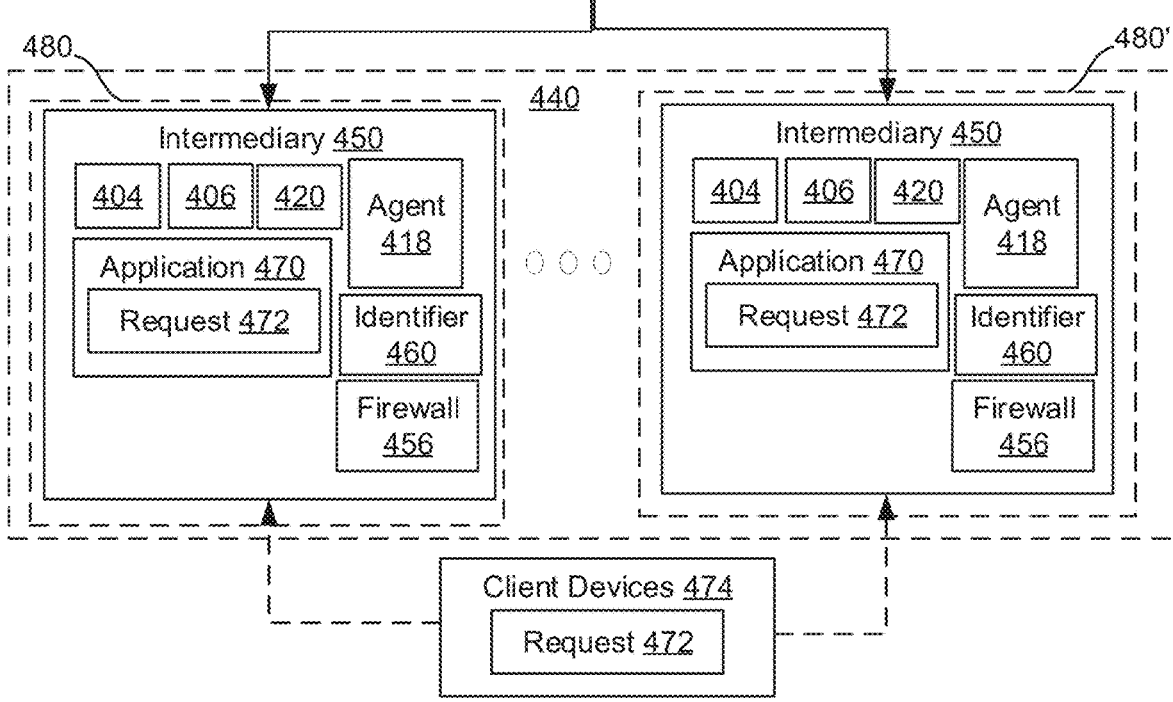
Figure 4C:
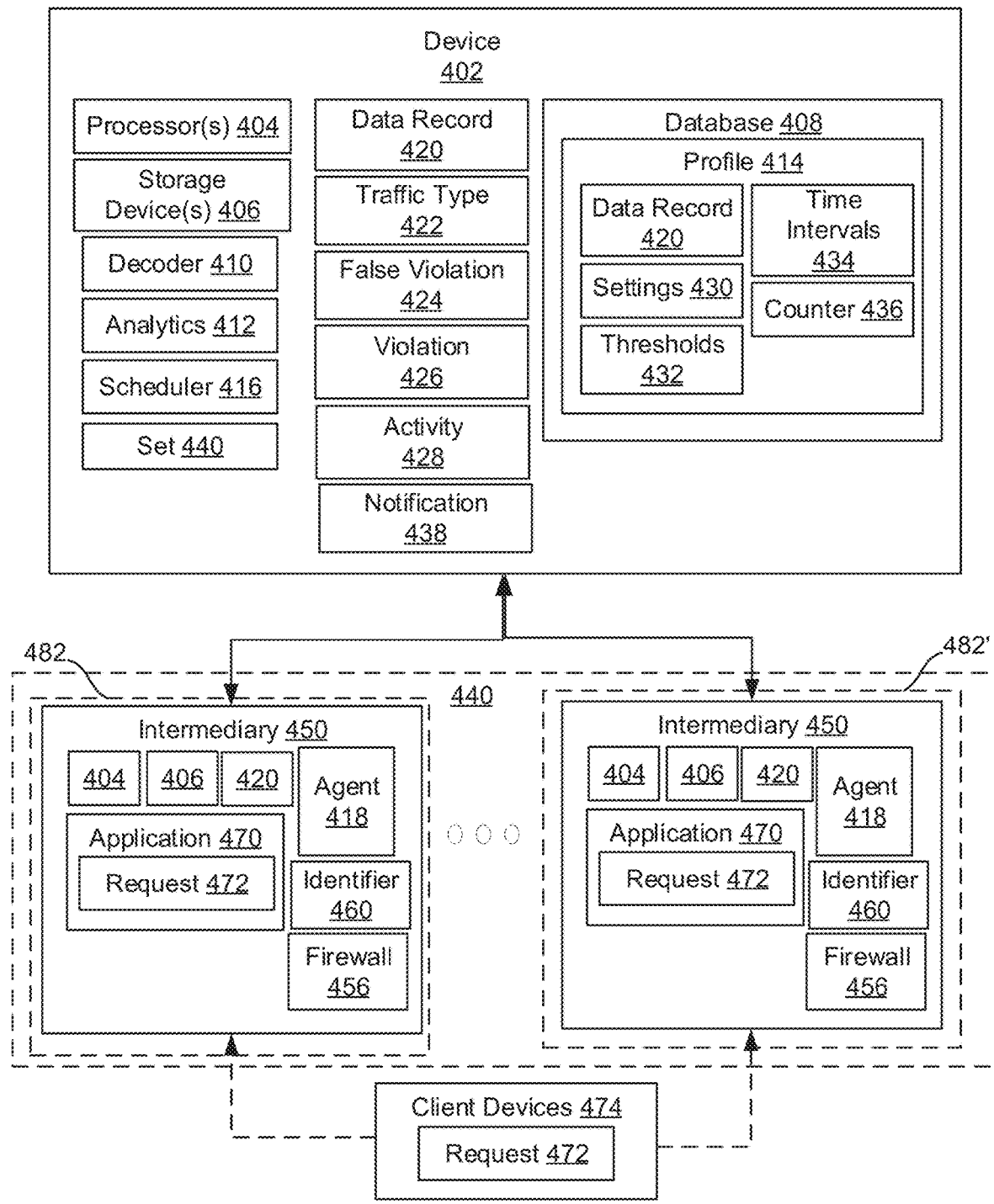
FIG. 4C is a block diagram of a system for operation of multiple application delivery controllers in different regions.
Figure 4D:
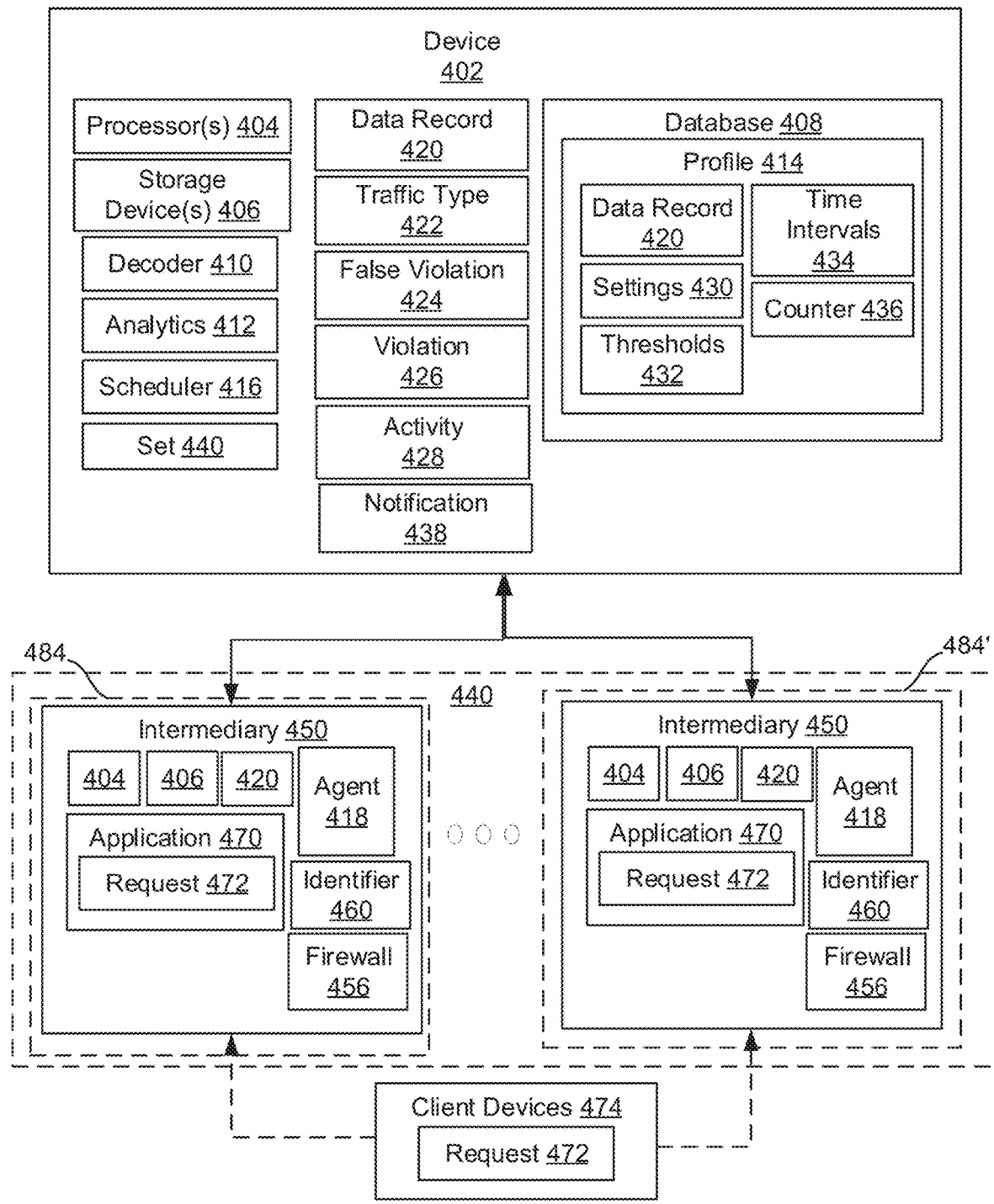
FIG. 4D is a block diagram of a system for operation of multiple application delivery controllers in different availability zones.

FIG. 3 shows an example embodiment of appliance 220. As described herein, appliance 220 may be implemented as a server, gateway, router, switch, bridge or other type of computing or network device. As shown in FIG. 3, an embodiment of appliance 220 may include a hardware layer 306 and a software layer 305 divided into a user space 302 and a kernel space 304. Hardware layer 306 provides the hardware elements upon which programs and services within kernel space 304 and user space 302 are executed and allow programs and services within kernel space 304 and user space 302 to communicate data both internally and externally with respect to appliance 220. As shown in FIG. 3, hardware layer 306 may include one or more processing units 362 for executing software programs and services, memory 364 for storing software and data, network ports 366 for transmitting and receiving data over a network, and encryption processor 360 for encrypting and decrypting data such as in relation to Secure Socket Layer (SSL) or Transport Layer Security (TLS) processing of data transmitted and received over the network.

An operating system of appliance 220 allocates, manages, or otherwise segregates the available system memory into kernel space 304 and user space 302. Kernel space 304 is reserved for running kernel 320, including any device drivers, kernel extensions or other kernel related software. As known to those skilled in the art, kernel 320 is the core of the operating system, and provides access, control, and management of resources and hardware-related elements of appliance 220. Kernel space 304 may also include a number of network services or processes working in conjunction with cache manager 322.

Appliance 220 may include one or more network stacks 367, such as a TCP/IP based stack, for communicating with client(s) 165, server(s) 195, network(s) 170, and/or other appliances 220 or WAN optimization appliances 205. For example, appliance 220 may establish and/or terminate one or more transport layer connections between clients 165 and servers 195. Each network stack 367 may include a buffer 243 for queuing one or more network packets for transmission by appliance 220.

Kernel space 304 may include cache manager 322, packet engine 340, encryption engine 324, policy engine 326 and compression engine 328. In other words, one or more of processes 322, 340, 324, 326 and 328 run in the core address space of the operating system of appliance 220, which may reduce the number of data transactions to and from the memory and/or context switches between kernel mode and user mode, for example since data obtained in kernel mode may not need to be passed or copied to a user process, thread or user level data structure.

Cache manager 322 may duplicate original data stored elsewhere or data previously computed, generated or transmitted to reducing the access time of the data. In some embodiments, the cache memory may be a data object in memory 364 of appliance 220, or may be a physical memory having a faster access time than memory 364.

Policy engine 326 may include a statistical engine or other configuration mechanism to allow a user to identify, specify, define or configure a caching policy and access, control and management of objects, data or content being cached by appliance 220, and define or configure security, network traffic, network access, compression or other functions performed by appliance 220.

Encryption engine 324 may process any security related protocol, such as SSL or TLS. For example, encryption engine 324 may encrypt and decrypt network packets, or any portion thereof, communicated via appliance 220, may setup or establish SSL, TLS or other secure connections, for example between client 165, server 195, and/or other appliances 220 or WAN optimization appliances 205. In some embodiments, encryption engine 324 may use a tunneling protocol to provide a VPN between a client 165 and a server 195. In some embodiments, encryption engine 324 is in communication with encryption processor 360. Compression engine 328 compresses network packets bi-directionally between clients 165 and servers 195 and/or between one or more appliances 220.

Packet engine 340 may manage kernel-level processing of packets received and transmitted by appliance 220 via network stacks 367 to send and receive network packets via network ports 366. Packet engine 340 may operate in conjunction with encryption engine 324, cache manager 322, policy engine 326 and compression engine 328, for example to perform encryption/decryption, traffic management such as request-level content switching and request-level cache redirection, and compression and decompression of data.

User space 302 is a memory area or portion of the operating system used by user mode applications or programs otherwise running in user mode. A user mode application may not access kernel space 304 directly and uses service calls in order to access kernel services. User space 302 may include graphical user interface (GUI) 310, a command line interface (CLI) 312, shell services 314, health monitor 316, and daemon services 318. GUI 310 and CLI 312 enable a system administrator or other user to interact with and control the operation of appliance 220, such as via the operating system of appliance 220. Shell services 314 include the programs, services, tasks, processes or executable instructions to support interaction with appliance 220 by a user via the GUI 310 and/or CLI 312.

Health monitor 316 monitors, checks, reports and ensures that network systems are functioning properly and that users are receiving requested content over a network, for example by monitoring activity of appliance 220. In some embodiments, health monitor 316 intercepts and inspects any network traffic passed via appliance 220. For example, health monitor 316 may interface with one or more of encryption engine 324, cache manager 322, policy engine 326, compression engine 328, packet engine 340, daemon services 318, and shell services 314 to determine a state, status, operating condition, or health of any portion of the appliance 220. Further, health monitor 316 may determine if a program, process, service or task is active and currently running, check status, error or history logs provided by any program, process, service or task to determine any condition, status or error with any portion of appliance 220. Additionally, health monitor 316 may measure and monitor the performance of any application, program, process, service, task or thread executing on appliance 220.

Daemon services 318 are programs that run continuously or in the background and handle periodic service requests received by appliance 220. In some embodiments, a daemon service may forward the requests to other programs or processes, such as another daemon service 318 as appropriate.

As described herein, appliance 220 may relieve servers 195 of much of the processing load caused by repeatedly opening and closing transport layer connections to clients 165 by opening one or more transport layer connections with each server 195 and maintaining these connections to allow repeated data accesses by clients via the Internet (e.g., "connection pooling"). To perform connection pooling, appliance 220 may translate or multiplex communications by modifying sequence numbers and acknowledgment numbers at the transport layer protocol level (e.g., "connection multiplexing"). Appliance 220 may also provide switching or load balancing for communications between the client 165 and server 195.

As described herein, each client 165 may include client agent 240 for establishing and exchanging communications with appliance 220 and/or server 195 via a network 170. Client 165 may have installed and/or execute one or more applications that are in communication with network 170. Client agent 240 may intercept network communications from a network stack used by the one or more applications. For example, client agent 240 may intercept a network communication at any point in a network stack and redirect the network communication to a destination desired, managed or controlled by client agent 240, for example to intercept and redirect a transport layer connection to an IP address and port controlled or managed by client agent 240. Thus, client agent 240 may transparently intercept any protocol layer below the transport layer, such as the network layer, and any protocol layer above the transport layer, such as the session, presentation or application layers. Client agent 240 can interface with the transport layer to secure, optimize, accelerate, route or load-balance any communications provided via any protocol carried by the transport layer.

In some embodiments, client agent 240 is implemented as an Independent Computing Architecture (ICA) client developed by Citrix Systems, Inc. of Fort Lauderdale, Fla. Client agent 240 may perform acceleration, streaming, monitoring, and/or other operations. For example, client agent 240 may accelerate streaming an application from a server 195 to a client 165. Client agent 240 may also perform end-point detection/scanning and collect end-point information about client 165 for appliance 220 and/or server 195. Appliance 220 and/or server 195 may use the collected information to determine and provide access, authentication and authorization control of the client's connection to network 170. For example, client agent 240 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Centralized Learning Across Multiple Application Delivery Controllers

Systems and methods for operation of intermediary devices (e.g., ADCs) managed by a device (e.g., a server that hosts Citrix Application Delivery Management (ADM) software) using a learning profile are provided herein, for example, to aggregate data received from the intermediary devices and learn traffic patterns across the multiple intermediary devices. The device can segregate or organize multiple intermediary devices into a common set based in part on an identifier of an intermediary device, on a property of a firewall and/or a property of an application executable on the intermediary device and create a learning profile for the set. The learning profile can provide multiple levels of learning by aggregating data from the different intermediary devices and identifying traffic patterns and/or traffic behaviors across the intermediary devices, including intermediary devices in different environments.

The device can request and/or receive data records from the intermediary devices in the set as part of a security check or security insight and aggregate the received data records in the learning profile. In embodiments, the device can provide or deploy an agent at the intermediary device instances to communicate with and/or collect data from intermediary devices managed by the device. The data records can include or correspond to different types of traffic. The device can determine, using the aggregated data, whether any type of traffic exceeded a threshold, such as a violation threshold or a false positive threshold. If a type of traffic has exceeded a threshold, new or updated settings can be generated using the learning profile and the device can propagate the new or updated settings to the intermediary devices in the set. The new or updates settings can be deployed at firewalls of the intermediary devices to prevent or reduce future security breaches at the intermediary devices in the set or reduce or prevent a particular type of traffic resulting a falsely identified violation at the intermediary devices in the set. The device can use the learning profile to scale and propagate changes across the multiple intermediary devices, including intermediary devices executing in different cloud environments, different regions and/or different zones. In embodiments, the device can use the learning profile to scale and propagate relaxation rules or exceptions across the multiple intermediary devices managed by the same device to synchronize the settings and rules across the intermediary devices managed by the same device.

Referring to FIGS. 4A-4D, depicted are block diagrams of an environment 400 having a device 402 (e.g., a server that hosts Citrix Application Delivery Management software) managing and monitoring a plurality of intermediary devices 450 (e.g., ADCs). The environment 400 can include one or more cloud environments 480, one or more regions 482 or one or more availability zones 484. The intermediary devices 450 can manage applications 470 in the same computing environment 400 or different computing environments 400. For example, one or more intermediary devices 450 of a set 440 can be configured to load balance data of one more applications 470 hosted in a first computing environment 400 and one or more intermediary devices 450 of the set 440 can be configured to load balance data of one or more applications 470 hosted in a second, different computing environment 400'.

The cloud environment 480 can be the same or substantially similar to cloud 175 of FIG. 1B. In embodiments, and as provided in FIG. 4B, one or more intermediary devices 450 of a set 440 can be configured to load balance data of one more applications 470 hosted in a first cloud environment 480 and one or more intermediary devices 450 of the set 440 can be configured to load balance data of one or more applications 470 hosted in a second, different cloud environment 480'. The region 400 can include a cloud region, a provider region or a geographic region or location where the cloud resources are located. The region 482 can include a geographic region or location one or more data centers serving the intermediary device 450 and/or applications 470 are located. In embodiments, and as provided in FIG. 4C, one or more intermediary devices 450 of a set 440 can be configured to load balance data of one more applications 470 hosted in a first region 482 and one or more intermediary devices 450 of the set 440 can be configured to load balance data of one or more applications 470 hosted in a second, different region 482'. The availability zone 484 can include a logical data center in a region available for use by one or more intermediary devices 450 and one or more applications 470. In embodiments, and as provided in FIG. 4D, one or more intermediary devices 450 of a set 440 can be configured to load balance data of one more applications 470 hosted in a first availability zone 484 and one or more intermediary devices 450 of the set 440 can be configured to load balance data of one or more applications 470 hosted in a second, different availability zone 484'.

The device 402 can include or correspond to a centralized management device to manage, monitor and/or troubleshoot the plurality of intermediary devices 450 across one or more different environments 400. In embodiments, the device 402 can perform management of the plurality of intermediary devices 450 from a single device or single interface to initialize, deploy, update or modify the plurality of intermediary devices 450 from the common device 402. The device 402 can monitor the intermediary devices 450 and traffic experienced at the intermediary devices 450 to troubleshoot and dynamically propagate changes across the plurality of intermediary devices 450 in real-time, for example, in response to an attack, malicious request or a falsely identified violation 424 occurring at one of the intermediary devices 450 of the plurality of intermediary devices 450. For example, the device 402 can collect or request analytics (e.g., data records 420) from the intermediary devices 450 that include a health, performance and security information of the respective intermediary devices 450, firewalls 456 provided by the intermediary devices 450 and one or more applications 470 monitored by the intermediary devices 450. The device 402 can use the collected analytics to learn traffic patterns and traffic behaviors across the plurality of intermediary devices 450 and generate or update settings 430 for the intermediary devices 450 to prevent malicious attacks and/or prevent falsely identified violations 424. The device 402 can configure or manage the settings 430 of firewalls 456 provided by the intermediary devices 450 based on the learned traffic behavior to scale and propagate changes across the intermediary devices 450 in one or more different environments 400 from the single device 402. The device 402 can be the same as or substantially similar to computer 100 of FIG. 1A or appliance 220 of FIGS. 2A, 2B and 3.

The device 402 can be implemented using hardware or a combination of software and hardware. For example, components of the device 402 can include logical circuitry (e.g., a central processing unit or CPU) that responds to and processes instructions fetched from a memory unit (e.g., storage device 206). Components of the device 402 can include or use a microprocessor or a multi-core processor. A multi-core processor can include two or more processing units (e.g., processor 404) on a single computing component. Components of the device 402 can be based on any of these processors, or any other processor capable of operating as described herein. Processors can utilize instruction level parallelism, thread level parallelism, different levels of cache, etc. For example, the device 402 can include at least one logic device such as a computing device or server having at least one processor 404 to communicate. The components and elements of the device 402 can be separate components or a single component. The device 402 can include a memory component (e.g., storage device 406, database 408) to store and retrieve data (e.g., data records 420, profiles 414). The memory can include a random access memory (RAM) or other dynamic storage device, coupled with the storage device 406 for storing information, and instructions to be executed by the device 402. The memory can include at least one read only memory (ROM) or other static storage device coupled with the storage device 406 for storing static information and instructions for the device 402. The memory can include a storage device 406, such as a solid state device, magnetic disk or optical disk, to persistently store information and instructions.

The device 402 can include a processor 404. The processor 404 can include non-volatile memory that stores computer instructions and an operating system. For example, the computer instructions can be executed by the processor 404 out of volatile memory to perform all or part of the method 500. In some embodiments, the device 402 can include a non-transitory computer-readable medium, comprising instructions that, when executed by the processor 404 of the device 402, cause the processor 404 to perform all or part of the method 500.

The device can include a database 408 to store and maintain profiles 414 (e.g., learning profiles) for a set 440 of intermediary devices 450, data records 420 received from the intermediary devices 450 and settings 430 generated for the intermediary devices 450. The database 408 can be the same as or substantially similar to storage device 406. The database 408 can be a component of the device 402. In some embodiments, the database 408 can be remote from the device 402 and the device 402 can be connected to the database 408 through environment 400 to store and maintain data from the intermediary devices 450.

The device 402 can generate and maintain profiles 414 for sets 440 of intermediary devices 450. The profile 414 can include a learning profile for aggregating data from multiple different intermediary devices 450 and learning traffic patterns and traffic behaviors at the intermediary devices 450 and/or firewalls 456 provided by the intermediary devices 450. The learning profile 414 can include a template or database having a plurality of entries to store and maintain data records 420 (e.g., aggregated data records). The learning profile 414 can include a filter (e.g., pattern filter) that enables the device 402 to detect repeated activities 428 or behavior at one or more intermediary devices 450 and/or firewalls 456. The learning profile 414 can include a plurality of settings 430 generated based in part on the detected repeated activity 428 to prevent the activity or allow the activity 428. In some embodiments, the profile 414 can include at least one aggregated data record 420 for a plurality of types of traffic 422. The aggregated data record 420 can include or correspond to a data record 420 having data aggregated or combined from multiple data records 420 from one or more intermediary devices 450. The types of traffic 422 can include violations, malicious requests, false positives 424 (e.g., falsely identified violations), activity causing a security breach, activity initiated by a malicious actor (e.g., bot attacks, web crawler). The number of data records 420 and/or types of traffic 422 to monitor can vary and be selected based at least on the activity or traffic observed at one or more intermediary devices 450 and/or at one or more firewalls 456.

The profile 414 can include a learning filter (e.g., repetitive learning filter) to identify and learn patterns based in part on a type of traffic 422 and/or type of information occurring multiple times in one or more received data records 420. For example, the profile 414 can include a repetitive pattern filter that observes activity (e.g., traffic, requests 472) at an intermediary device 450, an application 470 (e.g., server, web site) protected by a firewall 456 (e.g., web application) of an intermediary device 450, to learn and determine what is normal activity at the intermediary device 450 or application and/or learn and determine what type of activity corresponds to attack traffic or violations.

The profile 414 can generate settings 430 based in part on the learned traffic patterns to address or support a learned feature or pattern. For example, the profile 414 can generate settings 430 to prevent a type of traffic 422 from causing a security breach or to allow a type of traffic 422 via firewalls 456 of the intermediary devices 450. The settings 430 can identify an entity (e.g., IP address, device identifier) to be blocked or prevented from access or to be allowed access. The settings 430 can identify a content type, request type, or application content to be protected. The settings 430 can include, but not limited to, rules or exceptions (e.g., relaxations) for security checks or upgrades at the firewalls 456 of the intermediary devices 450. The profile 414 can scale and automate the modification of settings 430 for a plurality of intermediary devices 450 by learning traffic patterns and deploying new settings 430 across the plurality of intermediary devices 450 in real-time, for example, in contrast to individually analyzing data from intermediary devices 450 individually and updating settings at the intermediary devices 450 individually.

The device 402 can generate thresholds 432 to identify traffic patterns and determine, for example, when to generate new settings 430 and/or deploy a settings 430 via the profile 414. The threshold 432 can include a value, integer, or percent. The thresholds 432 can include or correspond to a minimum threshold or percent threshold representing a number of times, instances or data records 420 that a type of traffic 422 is observed before the type of traffic 422 is identified as a traffic pattern and the device 402 generates a setting 430 to address (e.g., prevent, allow) the type of traffic 422. The thresholds 432 can include or correspond to a percent threshold representing a percentage of times, instances or data records 420 that a type of traffic 422 is observed based on aggregate data records 420 from the plurality of intermediary devices 450 before the type of traffic 422 is identified as a traffic pattern and the device 402 generates a setting 430 to address the type of traffic 422. In some embodiments, the thresholds 432 can include or correspond to a minimum threshold, percent threshold or integer representing a minimum number of times, instances, data records 420 or user session that the type of traffic 422 is included in before the device 402 learns a rule or relaxation to address (e.g., prevent, allow) the type of traffic 422.

The thresholds 432 can indicate a type of traffic 422, an address of a device or entity transmitting a request, a type of request and/or a number of requests, for example, within a time interval 434. The device 402 can use the thresholds 432 and time intervals 434 to identify violations or activities falsely identified as violations. The device 402 can apply the thresholds 432 to data received from the intermediary devices 450 to learn traffic behaviors and identify malicious actors, malicious behaviors, violations and/or activities falsely identified as violations. For example, a threshold 432 can be generated for different traffic types that identifies a traffic type to block, prevent or allow requests corresponding to that traffic type. In embodiments, the threshold 432 can include a number or counter value assigned to a traffic type to block or prevent requests corresponding to that traffic type once the threshold number or counter value is exceeded or is exceeded within a time interval 434 (e.g., multiple request within a small time frame corresponding to a web crawling attack). The threshold 432 can include a number or counter value assigned to a traffic type 422 to allow requests corresponding to that traffic type while a total number of requests is less than threshold number or counter value for the time interval 434.

A threshold 432 can be generated for different addresses (e.g., IP addresses) of devices or entities attempting to access an application 470. For example, the device 402 can determine addresses of devices that have previously been identified as malicious actors (e.g., bots) or previously attempted to attack one or more applications 470 or intermediary devices 450 monitored by the device 402. The threshold 432 can include a number or counter value assigned to an address to block, filter or prevent requests originating from or associated with a particular address once the threshold number or counter value is exceeded or is exceeded within a time interval 434. The threshold 432 can include a number or counter value assigned to an address to allow requests originating from or associated with a particular address. The device 402 can use the address threshold 432 to identify addresses that may be malicious actors, for example, in response to a number of requests exceeding the threshold being received from the address within the time interval 434. In some embodiments, the device 402 can assign or generate a threshold 432 and time interval 434 for an address responsive to an initial or first request from the address and use the threshold 432 to learn and identify if the address is associated with a malicious actor.

A threshold 432 can be based in part on a type of request to block, prevent or allow requests corresponding to a particular type of request. The threshold 432 can include a number or counter value assigned to a type of request to block or prevent requests corresponding to that request type once the threshold number or counter value is exceeded or is exceeded within a time interval 434. The threshold 432 can include a number or counter value assigned to a request type to allow requests corresponding to that request type while a total number of requests is less than threshold number or counter value for the time interval 434.

The device 402 can generate time intervals 434 for the types of traffic 422 and/or thresholds 432 to learn and identify traffic patterns across a plurality of intermediary devices 450. The time interval 434 can represent a time difference between instances of the same type of traffic 422 being observed for the device 402 to determine or identify the type of traffic 422 is a traffic pattern. For example, if the respective type of traffic 422 is observed at a firewall 456 a number of times that exceeds the threshold 432 and is within the time interval 434, the device 402 can learn and identify the type of traffic 422 as a traffic pattern. The device 402 can use the thresholds 432 and the time intervals 434 in combination to learn a rule or relaxation to address (e.g., prevent, allow) a type of traffic 422. The device 402 can modify (e.g., dynamically) the thresholds 432 and/or time intervals 434 to address security issues, breaches or falsely identified violations 424 at one or more firewalls 456 of the intermediary devices 450 to address or respond to the respective security issues, breaches and/or falsely identified violations 424.

The device 402 can generate a counter 436 for the profile 414. The counter 436 can be used to track and monitor a number of data records 420 received from intermediary devices 450 of a set 440. In embodiments, the device 402 can create and initiate a counter 436 with a value of zero for a profile 414 responsive to creating the profile 414. The device 402 can increment the counter (e.g., by 1 for each data record received) for data records 420 received from intermediary devices 450. In some embodiments, the device 402 can generate a counter 436 for a type of traffic 422 and/or a data record 420 (e.g., aggregated data record). For example, the device 402 can use the counter 436 to track and monitor a number of times, instances or a percentage of instances that a type of traffic 422 is observed at a firewall 456 of one or more intermediary devices 450 and included within a data record 420 received from the intermediary devices 450. The device 402 can increment the counter 436 for instances or times the respective type of traffic 422 is included within or identified within a data record 420 such that the counter 436 for a data record 420 indicates the number of entries of the respective aggregated data record 420 (e.g., number of data records 42 including the type of traffic 422 added to the aggregated data record 420). The device 402 can compare the counter 436 to the threshold 432 for the type of traffic 422 and/or aggregated data record to identify a traffic pattern and/or to determine or otherwise generate settings 430 in view of the type of traffic 422 exceeding the threshold 432. The device 402 can use the thresholds 432, the time intervals 434 and counter 436 in combination to learn a rule or relaxation to address (e.g., prevent, allow) a type of traffic 422 and to determine when to generate settings 430 for a type of traffic 422. The device 402 can generate one or more notifications 438. The notifications 438 can be used to deploy the profile 414 and/or settings 430 to one or more intermediary devices 450. The notification 438 can include an instruction or command that includes the profile 414 and/or settings 430 (e.g., exemptions) and instructs an intermediary device 450 to update a firewall 456 to include the settings 430. The notification 438 can include an API call, a command or an instruction or a template including the modified profile 414 and/or settings 430.

A set 440 of intermediary devices can include a grouping, subset or cluster of two or more intermediary devices 450. The device 402 can organize or segregate the intermediary devices 450 into one or more sets 440 for monitoring and management of the segregated intermediary devices 450. For example, the device 402 can generate and deploy settings 430 for firewalls 456 of intermediary devices 450 in a common set 440 such that settings 430 of the firewalls of individual intermediary devices 450 in the set 440 are synchronized are synchronized. A set 440 can include intermediary devices 450 executing in one or more different cloud environments 480, one or more different regions 482 and/or one or more different availability zones 484. The device 402 can use the set 440 of intermediary devices 450 to learn and identify traffic patterns observed at firewalls 456 of the intermediary devices 450 of the set 440 and generate settings 430 for the intermediary devices 450 managed by the device 402. In embodiments, the device 402 can use the set 440 to scale and propagate changes across intermediary devices 450 in one or more different cloud environments 480, one or more different regions 482 and/or one or more different availability zones 484.

The device 402 can deploy or provide an agent 418 to intermediary devices 450 monitored and managed by the device 402. The agent 418 can execute at or be deployed at an intermediary device 450 to perform monitoring, data collection, aggregation, analysis, management and reporting, for example, to the device 402. The agent 418 can access and retrieve data records 420 from an intermediary device 450 and transmit the data records 420 to the device 402, for example, during a security check. In some embodiments, the agent 418 can generate the data records 420 for an intermediary device 450 by accessing or requesting traffic data from the respective intermediary device 450 and/or a firewall 456 of the intermediary device 450 and transmit the data records 420 to the device 402. The agent 418 can be implemented using hardware or a combination of software and hardware.

The intermediary devices 450 can be deployed to monitor and protect one or more applications 470 (e.g., web applications, servers). For example, an intermediary device 450 can be deployed between one or more client devices 474 and one or more applications 470 and/or servers to receive, process and manage requests from the client devices 474 for the one or more applications 470 and/or servers. The intermediary devices 450 can perform load balancing of applications 470 to process requests 472 from client devices 474, act as a proxy or access server to provide access to the one or more applications 470, provide security and/or act as a firewall between the client devices 474 and the applications 470 and/or provide encryption and decryption operations. The intermediary devices 450 can be the same as or substantially similar to computer 100 of FIG. 1A or appliance 220 of FIGS. 2A, 2B and 3.

In embodiments, the intermediary devices 450 can include or provide a firewall 456 to monitor and filter traffic to one or more applications 470 to permit or block the traffic (e.g., requests 472, data packets) based on one or more settings 430 (e.g., rules, exceptions). The firewall 456 can include, but not limited to, a web application firewall to protect the applications from one or more types of traffic 422, such as but not limited to, malicious attacks, cross-site scripting (XSS), SQL injection, cookie poisoning, and/or other types of violations that can cause or result in security breaches. The firewall 456 can include a network component or filter configured to monitor incoming and outgoing network traffic and permit or block traffic based in part on one or more settings 430 (e.g., rules, exemptions) deployed at the respective firewalls 456. The firewall 456 can include one or more settings 430 and use the settings 430 to provide filtering, monitoring, and blocking of malicious types of traffic 422 intended for the applications 470 to prevent security breaches and/or unauthorized data from being access from the respective application 470. The settings 430 can include rules indicating different types of activity, requests 472 or traffic 422 to prevent or deny and/or different types of activity, requests 472 and/or traffic to allow and process to one or more applications 470. The intermediary devices 450 can execute or deploy a single firewall 456 or multiple firewalls 456.

The firewalls 456 can include properties such as, but not limited to, a name, identifier and/or firewall profile name and/or a type of profile. The properties can identify the respective firewall 456, and/or the settings 430 of the firewall 456. For example, different firewalls 456 can execute or include different settings 430 and based in part on the name of the firewall 456, the device 402 can determine the settings 430 of the respective firewall 456.

The intermediary devices 450 can include properties such as, but not limited to, a name, an identifier 460 and/or type of intermediary device 450. The device 402 can use the properties (e.g., identifier 460) of the intermediary devices 450 to group, organize and/or select the respective intermediary device 450 for a set 440. The intermediary devices 450 can be implemented using hardware or a combination of software and hardware. The components of the intermediary devices 450 can include logical circuitry (e.g., a central processing unit or CPU) that responses to and processes instructions fetched from a memory unit (e.g., storage device 406). The components of the intermediary devices 450 can include or use a microprocessor or a multi-core processor. A multi-core processor can include two or more processing units (e.g., processor 404) on a single computing component. The components of the intermediary devices 450 can be based on any of these processors, or any other processor capable of operating as described herein. The intermediary device 450 can include at least one logic device such as a computing device or server having at least one processor 404 to communicate. The components and elements of the intermediary devices 450 can be separate components or a single component. The intermediary devices 450 can include a memory component (e.g., storage device 406, database 408) to store and retrieve data (e.g., data records 420, settings 430). The memory can include a random access memory (RAM) or other dynamic storage device, coupled with the storage device 406 for storing information, and instructions to be executed by the respective intermediary device 450. The memory can include at least one read only memory (ROM) or other static storage device coupled with the storage device 406 for storing static information and instructions for the respective intermediary device 450. The memory can include a storage device 406, such as a solid state device, magnetic disk or optical disk, to persistently store information and instructions.

The device 402 can include a decoder 410. The decoder 410 can be implemented using hardware or a combination of software and hardware. For example, the decoder 410 can include logical circuitry (e.g., a processor, a central processing unit or CPU) that responds to and processes instructions fetched from a memory unit (e.g., storage device 406). In embodiments, the decoder 410 can convert, decode and/or decrypt data records 420 received from the different intermediary devices 450 into a common format such that the data records 420 can be aggregated to learn and identify traffic patterns and behaviors across the different intermediary devices 450. For example, the device 402 can modify a file format of the data record 420 from a first format to a second different format such that each of the received data records 420 are converted and stored in the same format. The device 402 can modify one or more bits of the data record 420 to convert the data record 420 from the first format to the second format. In embodiments, the device 402 can receive an encoded data record 420 from the intermediary device 450 and decode the data record 420 to convert data record 420 to the second format. The device 402 can receive an encrypted data record 420 from the intermediary device 450 and decrypt the data record 420 to convert data record 420 to the second format.

The device 402 can include an analytics component 412. The analytics component 412 can be implemented using hardware or a combination of software and hardware. The analytics component 412 can include logical circuitry (e.g., a central processing unit or CPU) that responds to and processes instructions fetched from a memory unit (e.g., storage device 406). In embodiments, the analytics component 412 can aggregate data records 420 from multiple different intermediary devices 450 to generate aggregated data records 420 and learn and identify traffic patterns and behaviors across the different intermediary devices 450 using the aggregated data records 420.

The device can include a scheduler 416. The scheduler 416 can be implemented using hardware or a combination of software and hardware. The scheduler 416 can include logical circuitry (e.g., a central processing unit or CPU) that responds to and processes instructions fetched from a memory unit (e.g., storage device 406). In embodiments, the scheduler 416 can assign and generate requests for intermediary devices 450 to provide data records 420 as part of operation of the system, for example to perform a security check up or health check up. The scheduler 416 can identify, select, assign, and deploy the profile 414, including updated settings 430, to intermediary devices 450 in a set 440 to scale and propagate the changes across the intermediary devices 450 of the set 440 such that the settings 430 of the intermediary devices 450 in a set 440 are synchronized.

The applications 470 can include web applications, servers, resources, desktops, and or files. In embodiments, the applications 470 can include local applications (e.g., local to a client device 474), hosted applications, Software as a Service (SaaS) applications, virtual desktops, virtual applications, web applications, mobile applications, and other forms of content. In some embodiments, the applications 470 can include or correspond to applications provided by remote servers or third party servers. The applications 470 can include properties such as an application name and/or type of application. The device 402 can use the application properties to organize, group or segregate intermediary devices 450 monitoring the respective applications 470. For example, in some embodiments, the device 402 can segregate the intermediary devices 450 into one or more sets 440 based in part on a name of an application 470 the respective intermediary devices 450 monitor and protect.

The client device 474 can include, but is not limited to a computing device or a mobile device. The client device 474 can include or correspond to an instance of any client device, mobile device or computer device described herein. For example, the client device 474 can be the same as or substantially similar to computer 100 of FIG. 1A.

Each of the above-mentioned elements or entities is implemented in hardware, or a combination of hardware and software, in one or more embodiments. Each component of the device 402 may be implemented using hardware or a combination of hardware or software detailed above in connection with FIGS. 1A-3. For instance, each of these elements or entities can include any application, program, library, script, task, service, process or any type and form of executable instructions executing on hardware of a device (e.g., device 402). The hardware includes circuitry such as one or more processors in one or more embodiments.

Figure 5:
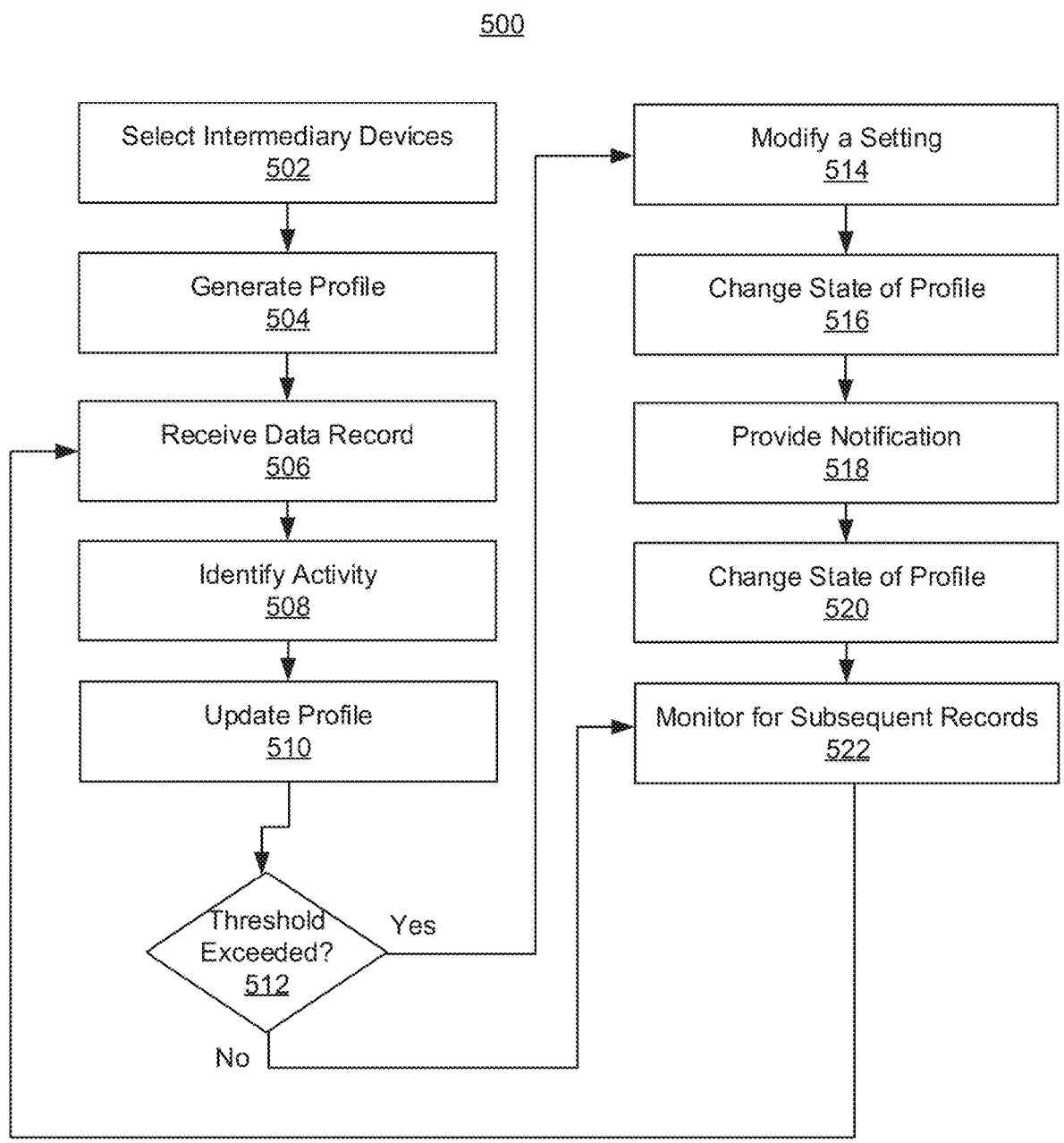
FIG. 5 is a flow diagram of a method for operation of multiple application delivery controllers.

Referring now to FIG. 5, depicted is a flow diagram of one embodiment of a method 500 for operation of multiple ADCs. In brief overview, the method 500 can include one or more of: selecting a set of intermediary devices (502), generated a profile (504), receiving a data record (506), identifying activity (508), updating the profile (510), determining if a threshold is exceeded (512), modifying a setting (514), changing a state of the profile (516), providing a notification (518), changing a state of the profile (520), and monitoring for a subsequent data record (522). The functionalities of the method 500 may be implemented using, or performed by, the components detailed herein in connection with FIGS. 1A-4D.

Referring now to operation (502), and in some embodiments, a set of intermediary devices 450 can be selected. A device 402 (e.g., application delivery management (ADM)) can manage and monitor a plurality of intermediary devices 450 (e.g., application delivery controllers (ADC) 450) across different cloud environments 480, different regions 482 and/or different availability zones 484. The device 402 can provide centralized management of multiple intermediary devices 450 to troubleshoot or modify settings 430 across the intermediary devices 450, in real-time and simultaneously, for example, instead of modifying settings 430 at each intermediary device 450 individually. In some embodiments, the device 402 can modify settings 430 to a firewall 456 executing at multiple intermediary devices 450 and deploy the modified settings 430 to the intermediary devices 450 simultaneously.

The device 402 can select a set of intermediary devices 450 (e.g., subset of ADC instances) from the plurality of intermediary devices 450 managed by the device 402, for example, to learn traffic patterns and traffic behaviors at firewalls 456 provided by the intermediary devices 450 of the set 440. In embodiments, the intermediary devices 450 can provide the firewalls 456 to monitor, manage and/or control traffic (e.g., requests 472) to one or more applications 470. The intermediary devices 450 can provide load balancing for traffic (e.g., requests 472) to one or more applications 470. The device 402 can select, organize, group and/or segregate the intermediary devices 450 in a set of intermediary devices 450 based in part on an identifier 460 of an intermediary device 450, a property (e.g., name, type) of a firewall 456 provided by the intermediary device 450, and/or a property (e.g., name, type) of an application 470 monitored by the intermediary device 450. The device 402 can create the sets 440 of intermediary devices 450 to perform data aggregation across the selected intermediary devices 450 and use the aggregated data for learning traffic patterns including, but not limited to, identifying malicious attacks and/or identifying events resulting in false positives or events falsely being identified as violations.

In some embodiments, the device 402 can determine that multiple intermediary devices 450 are monitoring different applications 470 (e.g., different types or different names) and are providing the same or a common form of a firewall 456 (e.g., same firewall name, same firewall profile) to protect the different applications 470. The device 402 can select the multiple intermediary devices 450 providing the same firewall 456 for a common set 440 or segregate the multiple intermediary devices 450 providing the same firewall 456 into a common set 440 with the common firewall 456 selected as the criteria for data aggregation. The device 402 can determine that multiple intermediary devices 450 are monitoring the same application 470 (e.g., same type, same name), for example, in different cloud environments and are providing different firewalls 456 (e.g., different firewall name, different firewall profile) in the different cloud environments. The device 402 can select the multiple intermediary devices 450 monitoring the same application 470 for a common set 440 or segregate the multiple intermediary devices 450 monitoring the same application 470 into a common set 440 with the application 470 selected as the criteria for data aggregation. In some embodiments, the device 402 can determine that multiple intermediary devices 450 are monitoring the same applications 470 (e.g., different types or different names) and are providing the same or a common form of a firewall 456 (e.g., same firewall name, same firewall profile) to protect the applications 470. The device 402 can use both the application 470 and the firewall 456 as criteria for data aggregation and select the multiple intermediary devices 450 monitoring the same application 470 and providing the same firewall 446 for a common set 440. The device 402 can monitor the set 440 of intermediary devices 450 to learn traffic patterns and traffic behaviors at the intermediary devices 450 of the set 440. The selection criteria for grouping or segregating the intermediary devices 450 can vary based at least in part on the properties of the intermediary devices 450, properties of one or more firewalls 456, and properties of one or more applications 470.

Referring now to operation (504), and in some embodiments, a profile 414 can be generated. The device 402 (e.g., computing device 402) can generate the profile 414 based on the selection of the set 440 of intermediary devices 450 managed by the device 402. The set 440 of intermediary devices 450 configured to load balance data of an application 470 hosted in different computing environments 400. The device 402 can generate or create the profile 414 (e.g., learning profile) for monitoring and activity 428 across one or more intermediary devices 450 in the selected set. The activity 428 can include but not limited to, traffic, traffic patterns and behaviors across one or more intermediary devices 450 in the selected set 440. The device 402 can use the profile 414 for logical segregation of intermediary devices 450 based in part on an ADC identifier 460, a property of a firewall 456 (e.g., web application firewall (WAF) name) and/or a property of an application 470 (e.g., application name). The profile 414 can provide multiple levels of learning across the intermediary devices 450 through data aggregation of traffic from intermediary devices 450 in one or more different cloud environments, one or more different regions and/or one or more different availability zones.

The device 402 can assign the profile 414 to at least one set 440 of intermediary devices 450 to learn traffic patterns at firewalls 456 provided by the intermediary devices 450 of the set 440. The device 402 can use the profile 414 to monitor and check activity 428 at individual intermediary devices 450 in a set 440 and determine if one or more different types of traffic 422 correspond to malicious traffic, security breaches and/or falsely identified violations 424. In some embodiments, the device 402 can create new settings 430 or modify existing settings 430 at the intermediary devices 450 in a set 440 based in part on learned traffic behavior occurring at one of the intermediary devices 450 in the set 440, for example, in response to a type of traffic 422 crossing a threshold 432 (e.g. attack vector, false positive threshold).

The profile 414 can include a plurality of settings 430. The settings 430 can include, but not limited to, firewall settings, load balancing settings, rules, exceptions (e.g., rule relaxations based on a type of traffic or violation). The device can store and maintain the profiles 414 and the settings 430 in a database 408. The device 402 can create thresholds 432 for the profile 414 based in part on a type of traffic 422. The device 402 can use the threshold 432 to identify traffic patterns and determine when to change or modify settings 430 (e.g., firewall settings) directed at a particular type of traffic 422, for example, to prevent the type of traffic 422 from causing a security breach or allow the type of traffic 422 via firewalls 456 of the intermediary devices 450. The thresholds 432 can represent a limit, a number of times or a number of instances that a particular type of traffic 422 can be received at a firewall 456 or intermediary device 450 before the type of traffic becomes a traffic pattern for the set 440. The threshold 432 can indicate a limit based on at least one of: a type of traffic, an address of a device, a number of requests, or a type of request. The threshold 432 can include a number, value or percentage and be assigned to at least one type of traffic 422 (e.g., malicious attacks, data breach, false violations). The device 402 can create a plurality of thresholds 432 for a profile 414 and the number of thresholds 432 can be based in part on a number of types of traffic identified at or experienced at firewalls 456 of the intermediary devices 450 in a respective set 440. In embodiments, the device 402 can dynamically generate thresholds 432 for a profile 414 in response to newly identified or received types of traffic 422 at one or more intermediary devices 450 of the respective set 440 the profile 414 is assigned.

The device 402 can assign a time interval 434 to a type of traffic 422. The time interval 434 can represent a time difference between instances of the same type of traffic 422 to determine or identify the type of traffic 422 as an attack or malicious traffic. For example, the time interval 434 can include a first value and a second value. If a type of traffic 422 occurs or is experienced at a firewall 456 multiple times (e.g., two or more times, two or more instances, hundred or more instances) within the time interval 434, the device 402 can determine the type of traffic 422 is an attack or malicious traffic (e.g., request from a bot, DoS attack). In embodiments, the device 402 can use the thresholds 432 and the time intervals to identify traffic patterns at one or more firewalls 456 of the intermediary devices 450 of a set 440.

The device 402 can generate a counter 436 for the profile 414. The counter 436 can indicate a number of data records 420 received from intermediary devices 450 of the set 440. The device 402 can initiate the counter 436 with a value of zero upon creating the profile 414 and increment the counter 436 by one for data records 420 received from an intermediary device 450 of the set 440. In some embodiments, the device 402 can generate a counter 436 for types of traffic 422. The counter 436 for the type of traffic 422 can indicate a number of data records 420 received from intermediary devices 450 of the set 440 that include that particular type of traffic 422. The device 402 can initiate the counter 436 for the type of traffic 422 with a value of zero upon creating the profile 414 and increment the counter 436 by one for each data record 420 received from an intermediary device 450 of the set 440 that includes that particular type of traffic 422.

Referring now to operation (506), and in some embodiments, a data record 420 can be received. The device 402 can receive, from an intermediary device 450 of the set 440, data (e.g., data record 420) for at least one application 470 monitored by the respective intermediary device 450. The data record 420 can be received or requested by the device 402 from the intermediary device 450 as part of a security check, upload or monitoring process of the intermediary devices 450 in the set 440. The data record 420 can include traffic information, such as but not limited to, requests 472 for one or more applications 470 monitored by an intermediary device 450 and received at or detected by a firewall 456. The data record 420 can include a time stamp or time value for when the respective request 472 was received and a classification for the request 472. The classification can indicate if the request 472 was allowed (e.g., forwarded to the application 470) or denied and a reasoning for allowing or denying the request 472. The classification and reasoning can indicate if the request 472 was identified as malicious traffic, a traffic violation and/or if the request 472 resulted in a security breach at the application 470 or intermediary device 450.

In some embodiments, the data record 420 can be converted from a first format to a second format at the device 402. The data record 420 can be received in a first format (e.g., encoded) from the intermediary device 450 and the device 402 can convert the data record 420 to second format for aggregating the data record 420 with other data records 420 received from other intermediary devices 450 in the set 440. The device 402 can receive an encoded data record 420 from the intermediary device 450 and decode the data record 420 to convert data record 420 to the second format. The device 402 can receive an encrypted data record 420 from the intermediary device 450 and decrypt the data record 420 to convert data record 420 to the second format. The conversion of the data record 420 can include modifying a file format of the data record 420 from a first format to a second different format or modifying one or more bits of the data record 420. The data records 420 can be received in different formats from the different intermediary devices 450 in the set 440. In some embodiments, the data records 420 can be encoded or encrypted by an intermediary device 450 prior to the intermediary device 450 transmitting the data record 420 to the device 402. The device 402 can convert (e.g., decode, decrypt) the data records 420 from the different intermediary devices 450 into a common format such that the data records 420 can be aggregated to learn and identify traffic patterns and behaviors across the different intermediary devices 450.

The device 402 can receive data records 420 from the intermediary devices 450 in a determined order or randomly. For example, intermediary devices 450 can transmit or provide one or more data records 420 at determined time intervals or in an determined order during a security check up of the intermediary devices 450 in the set 440. In some embodiments, the intermediary devices 450 can transmit the data records 420 in response to an event (e.g., a type of traffic, traffic violation, security breach) at a firewall 456 of the intermediary device 450. The intermediary devices 450 can transmit a data record 420 for a type of traffic 422 in response to a number of instances of the type of traffic 422 exceeding a threshold assigned to the type of traffic 422.

Referring now to operation (508), and in some embodiments, activity 428 can be identified. The device 402 can identify activity 428 at the set 440 of intermediary devices 450 with use of a firewall 456. The activity 428 can include or correspond to traffic at a firewall 456 of at least one intermediary device 450. The activity 428 can be identified in the received data record 420. In some embodiments, the activity 428 can have an appearance of a malicious attack on at least one intermediary device 450 of the set 440. For example, the data record 420 can include activity information on one or more types of traffic 422 occurring at firewalls 456. In embodiments, a data record 420 can be generated for different types of traffic 422 and an intermediary device 450 can transmit multiple data records 420 to the device 402 with individual data records 420 including information on a particular type of traffic 422. The device 402 can receive the data record 420 and identify an activity 428 corresponding to at least one type of traffic 422 (e.g., malicious traffic, permitted traffic, traffic falsely identified as a violation). The data record 420 can include multiple instances of a particular type of traffic 422 and a time value for the instance or a time range corresponding to when the multiples instances of the type of traffic 422 occurred. In some embodiments, the data record 420 can include multiple different types of traffic 422 organized or grouped within the data record 420 based on the respective type.

Referring now to operation (510), and in some embodiments, the profile 414 can be updated. The device 402 can update or modify, using the data 420 (e.g., data record 420), the profile 414 for the set 440. The device 402 can update at least one data record 420 of the profile 414 to include or identify the activity 428 and the type of traffic 422 included with the data record 420. The profile 414 can include a plurality of aggregated data records 420 and individual aggregated data records 420 can include or correspond to at least one activity 428 and at least one type of traffic 422 or include information from one or more intermediary devices 450 corresponding to at least one activity 428. Upon receiving a new data record 420, the device 402 can identify the corresponding aggregated data record 420 that includes the same activity 428 and aggregate or combine the traffic information of the new data record 420 with the traffic information included in the aggregated data record 420. The device 402 can combine the new data record 420 with one or more previously received data records 420 for the respective activity 428.

Referring now to operation (512), and in some embodiments, a determination can be made if a threshold 432 has been exceeded. The device 402 can make the determination based in part on a comparison of a counter 436 to the threshold 432 to determine if the threshold 432 has been exceeded. In embodiments, the device 402 can increment the counter 436 of the profile 414 based on the number of data records 420 received (e.g., aggregation of data records 420). The device 402 can increment the counter 436 assigned to an activity 428 and the aggregated data records 420 maintained at the profile 414 for the respective activity 428, for example, responsive to receiving a data record 420 including traffic information corresponding to the type of traffic 422 associated with the activity 428. The device 402 can compare the updated counter 436 to the threshold 432 assigned to the activity 428 and the aggregated data record 420 and determine if the updated counter value is greater than (e.g., exceeds) or less that the threshold 432.

The device 402 can determine if the activity 428 is permissible or not based on the comparison of the aggregation of data records 420 for the identified activity 428 and the threshold 428. The aggregation of data records 420 can be based on the generated profile 414, for example, included within the profile 414 for the set 440 of intermediary devices 450. The threshold 432 can identify a limit that the activity 428 is permitted to occur at a firewall 456 before the activity 428 becomes a violation 426 (e.g., SQL attacks, cross-site scripting). A violation 426 can include an infraction or breach of a firewall 456 or a breach of a policy, regulations or guidelines of a firewall 456 or application 470. A violation 426 can include an attempt to improperly access data or information the associated user does not have permission to access or modify data or information the associated user does not have permission to modify. In embodiments, a violation 426 can include a malicious attack, a structured query language (SQL) attack and/or a cross-site scripting attack. The device 402 can use the counter 436 to identify the number of times the activity 428 occurs and the threshold 432 to determine if a limit identified by the threshold 432 has been exceeded indicating a potential violation 426. The device 402 can use the counter 436 and threshold 432 to monitor traffic and activity 428 across the set 440 of intermediary devices 450 to monitor for attacks. The device 402 can determine that a type of traffic 422 identified in the aggregation of data records 420 exceeds the threshold 432 indicating a violation 426 for the type of traffic 422.

In some embodiments, the activity 428 can be falsely identified as a violation 424 and the device 402 can generate exemptions (e.g., relaxations) to reduce or eliminate the activity 428 from being identified as malicious or a violation 426 in the future. For example, the activity 428 can include or identify a number of times a type of traffic 422 has been blocked or prevented at a firewall 456. The device 402 can use the counter 436 and threshold 432 to identify that the type of traffic 422 has repeatedly been identified as a violation 426 and blocked, for example, based on the counter 436 exceeding the threshold 432, and generate exemptions to prevent it from happening in the future. The device 402 may include settings 430 (e.g., administrator settings, user settings, computing environment settings) previously identifying the activity 428 and/or type of activity 422 as permissible and can generate the exemptions to update settings 430 at the intermediary devices 450 to match of correspond to settings 430 at the device 402 and permit the activity 428 and/or type of activity 422 from being falsely identified as a violation.

In embodiments, the device 402 can determine that the activity 428 is permissible based on the comparison of the aggregation of data records 420 for the identified activity and the threshold 428. For example, the device 402 can determine that the counter 436 for the activity 428 is less than the threshold 432. In embodiments, the device 402 can determine that the activity 428 (e.g., subsequent activity) is a violation 426 (e.g., malicious activity) based on the comparison of the aggregation of data records 420 for the identified activity and the threshold 428. For example, the device 402 can determine that the counter 436 for the activity 428 is greater than the threshold 432. If the updated counter value is greater than (e.g., exceeds) the threshold 432, the method 500 can move to (514) to update or modify settings 430 for the activity. If the updated counter value is less than the threshold 432, the method 500 can move to (522) to monitor for a next or subsequent data record 420.

Referring now to operation (514), and in some embodiments, a setting 430 can be modified. The device 402 can, using the profile 414, create new settings 430 or update existing settings 430 of the firewalls 456 provided by the intermediary devices 450 of the set 440. The device 402 can create new settings 430 for a firewall 456 for example, to block or prevent a type of traffic 422 or to allow or otherwise permit a type of traffic 422. The device 402 can determine that the activity 428 and corresponding type of traffic 422 is an attack attempt or resulted in a security breach and generate new settings 430 or update existing settings 430 to be deployed at the intermediary devices 450 of the set 440 to prevent or deny the type of traffic 422 and reduce or prevent a security breach from happening again. For example, a change or modification to the settings 430 can include a reduced threshold 432 for the activity 428 to identify the activity 428 as an attack earlier or faster. Other changes to the settings 430 can include to block or prevent traffic or requests from an address of a device that the activity 428 or traffic originated from. To this end, the settings 430 can be applied to identify the type of traffic 422 associated with the activity 428 to block or prevent that type of traffic 428. Once applied, the settings 430 can enable identification of content in a request received in response to activity 428 or otherwise associated with the activity 428 indicative of malicious content or a violation 426. The application of the settings 430 can be varied so as to select at least one of them based in part on properties of the activity 428 indicative of a violation 426 or other malicious activity.

The device 402 can use the aggregation of data records 420 to monitor activity 428 across the set 440 of intermediary devices 450 and modify settings 430 across the set 440 of intermediary devices 450. For example, the device 402 can determine, using the aggregation of data records data 420, a violation 426 occurring at multiple intermediary devices 450 of the set 440 of intermediary devices 450. The device 402 can generate settings 430 to prevent the activity 428 occurring at the multiple intermediary devices 450. The device 402 can modify the profile 414 to include a setting 430 to prevent the violation 426 and/or the activity 428 across the multiple intermediary devices 450.

In embodiments, the device 402 can determine that an activity 428 and type of traffic 422 is a false positive or a falsely identified violation 424. For example, the device 402 can determine that the activity 428 is being incorrectly blocked or denied by one or more firewalls 456 of the intermediary devices 450 of the set 440 and/or is being incorrectly identified as a violation 426 at one or more firewalls 456 of the intermediary devices 450 of the set 440. The device 402 may include settings 430 identifying activities 428 and/or type of activities 422 as permissible. The device 402 can use the counter 436 and threshold 432 to identify that at least one activity 428 has repeatedly been identified as a violation 426. The device 402 can compare the activity 428 to the settings 430 indicating permissible activity 430 and determine that the activity 428 is being incorrectly blocked or denied by one or more firewalls 456 of the intermediary devices 450. The device 402 can provide or otherwise make exemptions to update settings 430 at the intermediary devices 450 allow the activity 428. The device 402 generate new settings 430 or update existing settings 430 to be deployed at each of the intermediary devices 450 and respective firewalls 456 to allow the type of traffic 422 and/or prevent the type of traffic from being falsely identified as a violation again. In embodiments, the new or updated settings 430 can include an exception to a rule of the firewall 456 or a relaxation to relax at least one rule of the firewall 456 to allow the activity 428, a type of traffic 422 and/or prevent the type of traffic from being falsely identified as a violation again.

The settings 430 can include an increased threshold 432 for the activity 428 or type of traffic 422. The settings 430 can include an address of a device that the activity 428 or traffic originated from to allow traffic or requests from the respective device. The settings 430 can identify the type of traffic 422 associated with the activity 428 to allow that type of traffic 428. The settings 430 can identify content in a request received with the activity 428 or associated with the activity 428 to identify activity 428 having the respective content as permissible. The settings 430 can vary and be selected based at least in part on properties of the activity 428 resulting in the false violation 424 or otherwise indicative of as malicious activity. The device 402 can modify, responsive to determining that the activity 428 is permissible, the profile 414 to include the exception for the activity 428 and/or type of traffic 422.

Referring now to operation (516), and in some embodiments, a state of the profile 414 can be changed. The device 402 can change a state of the profile 414 from a first (or ready) state to a second (or deployed) state. The state can indicate a condition or format of the profile 414 and whether the profile 414 is being updated (e.g., actively) or includes one or more settings prepared to be transmitted to one or more intermediary devices 450. In embodiments, the ready state can indicate that one or more settings 430 in the profile 414 are being actively updated or modified. In embodiments, the deploy state can indicate that one or more settings 430 in the profile 414 have reached a threshold and are prepared to be transmitted to one or more intermediary devices 450. The device 402 can maintain the profile 414 in the ready state until the profile 414 is ready to be deployed or is to be deployed responsive to a particular event, such as a data record 420 and/or type of traffic 422 exceeding a threshold 432. The device can, responsive to generating the new settings 430 or updating settings 430, change the state of the profile to the deploy state.

Referring now to operation (518), and in some embodiments, a notification 438 can be provided. The device 402 can provide the notification 438 to at least one intermediary device 450 of the set 440 in response to determining that the activity 428 was permissible or a violation 426. The notification 438 can include the updated profile 414 and/or one or more new or modified settings 430 to configure the intermediary device 450 to allow the activity 428 or prevent the activity 428 based on the determination. The device 402 can provide the notification 438 to the set 440 of intermediary devices 450 to update firewalls 456 of the set of intermediary devices 450 to include one or more setting 430 and/or one or more exceptions.

In embodiment, the device 402 can provide the notification 438 to at least one intermediary device 450 of the set 440 in response to the determination that the activity 428 is permissible. The notification 438 can configure the at least one intermediary device 450 to allow the activity 428 and/or a type of traffic 422 associated with the activity 428. In some embodiments, the device 402 can provide the notification 438 including the updated profile 414 to individual intermediary devices 450 in the set 440. The device 402 can provide the notification 438 to the set of intermediary devices 450 to update firewalls 456 of the set of intermediary devices 450 to include an exception to allow the activity 428.

In some embodiment, the device 402 can provide the notification 438 to at least one intermediary device 450 of the set 440 in response to the determination that the activity 428 is a violation 426. The notification 438 can configure the at least one intermediary device 450 to not allow the activity 428 and/or a type of traffic 422 associated with the activity 428. In some embodiments, the device 402 can provide the notification 438 including the updated profile 414 to individual intermediary devices 450 in the set 440. The device 402 can deploy or transmit the notification 438 and profile 414 to the intermediary devices 450 in the set 440 to update settings 430 at firewalls 456 of the intermediary devices 450. The notification 438 can include an instruction or command that includes the settings 430 and instructs the intermediary devices 450 to update firewalls 456. For example, the notification 438 can include an API call, a command or an instruction or a template including the modified profile 414. The device 402 can generate and transmit an API call, an instruction or command that includes the new settings 430 or updated settings 430 to the intermediary devices 450 in the set 440. In embodiments, the device 402 can maintain templates or configuration settings for the intermediary devices 450 and update or add the settings 430 to the template of the intermediary devices 450 (e.g., ADC instances 450) of the set 440 to deploy or propagate the settings 430 across the intermediary devices 450 in the set 440.

The device 402 can deploy the settings 430 generated based on the learned traffic patterns to the intermediary devices 450 in the set 440 to dynamically scale and propagate changes across the intermediary devices 450. The intermediary devices 450 can be in one or more different cloud environments, one or more different regions, and one or more different availability zones and the device 402 can use the profile 414 to synchronize (e.g., simultaneously) the settings 430 across each of the intermediary devices 450 in the set 440. The new or updated settings 430 can be deployed at firewalls 456 of the intermediary devices 450 to prevent or reduce future security breaches at the intermediary devices 450 in the set 440 or reduce or prevent a particular type of traffic 422 resulting a falsely identified violation 424 at the intermediary devices 450 in the set 440.

In embodiments, the device 402 can provide the notification 438 to include instructions with the profile 414 that cause the intermediary devices 450 to modify or update the settings 430 of the firewall 456 provided by the respective intermediary device 450 to be synchronized or match the settings 430 in the profile 414. In some embodiments, the device 402 can provide the profile 414 with the settings 430 to the intermediary devices 450 and the intermediary devices 450 can update or modify the settings 430 at a firewall 456 provided by the respective intermediary device 450 such that the settings 430 of the firewall 456 are synchronized or match the settings 430 in the profile 414. In embodiments, the device 402 can use the profile 414 (e.g., learning profile) to scale and propagate new settings 430 and/or exceptions (e.g., relaxations) across the multiple intermediary devices 450 managed by the same device 402 to synchronize the settings and rules across the intermediary devices 450 managed by the same device 450.

Referring now to operation (520), and in some embodiments, a state of the profile 414 can be changed. The device 402 can change a first (or ready) state of the profile 414 from the second (or deployed) state to the first state or ready state. In embodiments, responsive to deploying the profile 414 to the intermediary devices 450 of the set 440, the device 402 can change the state of the profile back to the first (or ready) state and wait until the profile 414 is ready to be deployed or is to be deployed responsive to a particular event, such as a data record 420 and/or type of traffic 422 exceeding a threshold 432.

Referring now to operation (522), and in some embodiments, the device 402 can monitor for subsequent a data record 420. The device 402 can wait for a next or subsequent data record 420 from at least one intermediary device 450 of the set 440. In embodiments, the device 402 can monitor the intermediary devices 450 in the set 440 for a next or subsequent data record 420 for a determined time period and after the time period, transmit a data record request to the intermediary devices 450 in the set 440, for example, as a part of a security check up. The data record request can include an order and/or time frame for the intermediary devices 450 to response to the request. Upon receiving a next or subsequent data record 420, the method 500 can move to (506) to process the data record 420.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
   generating, by a computing device, a profile based on selection of a set of intermediary devices managed by the computing device, the set of intermediary devices configured to load balance data of an application hosted in different computing environments;
   identifying, by the computing device, activity at the set of intermediary devices with use of a firewall, the activity having an appearance of a malicious attack on at least one intermediary device of the set;
   determining, by the computing device, that the activity is permissible based on a comparison of an aggregation of data records for the identified activity and a threshold, the aggregation of data records being based on the generated profile; and providing, by the computing device in response to the determination that the activity is permissible, one or more notifications to update the firewall based at least in part on the threshold and cause the at least one intermediary device to allow the activity.

2. The method of claim 1, comprising:

segregating, by the computing device, multiple intermediary devices into the set of intermediary devices based on at least one of: an identifier of the intermediary devices, a name of a firewall provided by the intermediary devices, or a name of an application monitored by the intermediary devices.

3. The method of claim 1, wherein the threshold indicates a limit based on at least one of: a type of traffic, an address of a device, a number of requests, or a type of request.

4. The method of claim 1, comprising:

modifying, by the computing device responsive to determining that the activity is permissible, the profile to include an exception for the activity; and providing, by the computing device to the set of intermediary devices, the one or more notifications to update firewalls of the set of intermediary devices to include the exception.

5. The method of claim 1, comprising:

determining, by the computing device, subsequent activity at the set of intermediary devices is not permissible based on a comparison of the aggregation of data records for the subsequent activity and the threshold; and providing, by the computing device, a subsequent notification to at least one intermediary device of the set in response to the determination that the subsequent activity is a violation, the subsequent notification to configure the at least one intermediary device to prevent the subsequent activity.

6. The method of claim 1, comprising:

determining, by the computing device, a type of traffic identified in the aggregation of data records exceeds the threshold indicating a violation of a rule of the firewall for the type of traffic; and providing, by the computing device to the set of intermediary devices, a subsequent notification to prevent the type of traffic responsive to the type of traffic exceeding the threshold.

7. The method of claim 1, comprising:

determining, by the computing device using the aggregation of data records data, a violation occurring at multiple intermediary devices of the set of intermediary devices;

modifying, by the computing device, the profile to include a setting to prevent the violation; and providing, by the computing device to the set of intermediary devices, a subsequent notification to update firewalls of the set of intermediary devices to include the setting.

8. The method of claim 1, comprising:

selecting, by the computing device, the intermediary devices for the set of intermediary devices based on a property of firewalls provided by the intermediary devices.

9. The method of claim 1, comprising:

selecting, by the computing device, the intermediary devices for the set of intermediary devices based on a property of at least one application monitored by the intermediary devices.

10. The method of claim 1, comprising:

incrementing, by the computing device responsive to receiving data from one or more intermediary devices, a value indicative of a number of records received from the set of intermediary devices; and providing, by the computing device responsive to the value exceeding the threshold, a subsequent notification to the set of intermediary devices to update firewalls of the set of intermediary devices.

11. The method of claim 1, comprising:

monitoring, by the computing device, the set of intermediary devices, wherein a plurality of the intermediary devices of the set of intermediary devices are executable in different computing environments, different regions or different zones from one another.

12. A system comprising:

a computing device comprising one or more processors coupled to memory, the computing device configured to:

generate a profile based on selection of a set of intermediary devices managed by the computing device, the set of intermediary devices configured to load balance data of an application hosted in different computing environments;

identify activity at the set of intermediary devices with use of a firewall, the activity having an appearance of a malicious attack on at least one intermediary device of the set;

determine that the activity is permissible based on a comparison of an aggregation of data records for the identified activity and a threshold, the aggregation of data records being based on the generated profile; and provide in response to the determination that the activity is permissible, one or more notifications to update the firewall based at least in part on the threshold and cause the at least one intermediary device to allow the activity.

13. The system of claim 12, wherein the device is configured to:

segregate multiple intermediary devices into the set of intermediary devices based on at least one of: an identifier of the intermediary devices, a name of a firewall provided by the intermediary devices, or a name of an application monitored by the intermediary devices.

14. The system of claim 12, wherein the device is configured to:

modify, responsive to determining that the activity is permissible, the profile to include an exception for the activity; and provide, to the set of intermediary devices, the one or more notifications to update firewalls of the set of intermediary devices to include the exception.

15. The system of claim 12, wherein the device is configured to:

determine subsequent activity at the set of intermediary devices is not permissible based on a comparison of the aggregation of data records for the subsequent activity and the threshold; and provide a subsequent notification to at least one intermediary device of the set in response to the determination that the subsequent activity is a violation, the subsequent notification to configure the at least one intermediary device to prevent the subsequent activity.

16. The system of claim 12, wherein the device is configured to:
    determine a type of traffic identified in the aggregation of data records exceeds the threshold indicating a violation of a rule of the firewall for the type of traffic; and
    provide, to the set of intermediary devices, a subsequent notification to prevent the type of traffic responsive to the type of traffic exceeding the threshold.

17. The system of claim 12, wherein the device is configured to:
    determine, using the aggregation of data records data, a violation occurring at multiple intermediary devices of the set of intermediary devices;
    modify the profile to include a setting to prevent the violation; and
    provide, to the set of intermediary devices, a subsequent notification to update firewalls of the set of intermediary devices to include the setting.

18. A non-transitory computer-readable medium, comprising instructions that, when executed by the processor of a device, cause the processor to:
    generate a profile based on selection of a set of intermediary devices managed by the computing device, the set of intermediary devices configured to load balance data of an application hosted in different computing environments;
    identify activity at the set of intermediary devices with use of a firewall, the activity having an appearance of a malicious attack on at least one intermediary device of the set;
    determine that the activity is permissible based on a comparison of an aggregation of data records for the identified activity and a threshold, the aggregation of data records being based on the generated profile; and
    provide in response to the determination that the activity is permissible, one or more notifications to update the firewall based at least in part on the threshold and cause the at least one intermediary device to allow the activity.

19. The computer-readable medium of claim 18, further comprising instructions that cause the processor to:
    modify, responsive to determining that the activity is permissible, the profile to include an exception for the activity; and
    provide, to the set of intermediary devices, the one or more notifications to update firewalls of the set of intermediary devices to include the exception.

20. The computer-readable medium of claim 18, further comprising instructions that cause the processor to:
    determine subsequent activity at the set of intermediary devices is a violation based on a comparison of the aggregation of data records for the subsequent activity and the threshold; and
    provide a subsequent notification to at least one intermediary device of the set in response to the determination that the subsequent activity is a violation, the subsequent notification to configure the at least one intermediary device to prevent the subsequent activity.

* * * * *